(12) United States Patent
Frank et al.

(10) Patent No.: US 11,004,001 B1
(45) Date of Patent: May 11, 2021

(54) ANALYSIS OF STRUCTURAL-DAMAGE PREDICTIONS CAUSED BY AN EARTHQUAKE TO IDENTIFY AREAS WITH HIGH DAMAGE LEVELS

(71) Applicant: One Concern, Inc., Palo Alto, CA (US)

(72) Inventors: Timothy Frank, Stanford, CA (US); Ahmad Wani, Mountain View, CA (US); Nicole Hu, Mountain View, CA (US); Gabe Alvarez, Palo Alto, CA (US)

(73) Assignee: ONE CONCERN, INC., Menlo Park, CA (US)

( * ) Notice: Subject to any disclaimer, the term of this patent is extended or adjusted under 35 U.S.C. 154(b) by 1039 days.

(21) Appl. No.: 15/490,132

(22) Filed: Apr. 18, 2017

Related U.S. Application Data

(63) Continuation-in-part of application No. 15/246,919, filed on Aug. 25, 2016.

(60) Provisional application No. 62/370,964, filed on Aug. 4, 2016, provisional application No. 62/264,989, filed on Dec. 9, 2015.

(51) Int. Cl.
| | |
|---|---|
| *G06F 17/50* | (2006.01) |
| *G01W 1/00* | (2006.01) |
| *G06F 15/00* | (2006.01) |
| *G06Q 50/26* | (2012.01) |
| *G06Q 40/08* | (2012.01) |
| *G06Q 30/02* | (2012.01) |
| *G06N 5/04* | (2006.01) |
| *G06N 20/00* | (2019.01) |

(52) U.S. Cl.
CPC ............... *G06N 5/04* (2013.01); *G06N 20/00* (2019.01)

(58) Field of Classification Search
CPC .................................. G06N 5/04; G06N 20/00
USPC ....................................................... 706/1–62
See application file for complete search history.

(56) References Cited

U.S. PATENT DOCUMENTS

| | | | | |
|---|---|---|---|---|
| 10,205,326 | B2 * | 2/2019 | Corum | .................. H02J 5/005 |
| 10,740,684 | B1 | 8/2020 | Wani et al. | |
| 2004/0236676 | A1 | 11/2004 | Takezawa et al. | |

(Continued)

OTHER PUBLICATIONS

"U.S. Appl. No. 15/246,919, Response filed Mar. 20, 2020 to Non Final Office Action dated Nov. 20, 2019", 21 pgs.

(Continued)

*Primary Examiner* — Brandon S Cole
(74) *Attorney, Agent, or Firm* — Schwegman Lundberg & Woessner, P.A.

(57) ABSTRACT

Methods, systems, and computer programs are presented for determining cluster areas within a region having higher estimates of damage caused by an earthquake as compared to damage in nearby areas. One method includes operations for identifying features associated with buildings within the region, and for training a machine learning program based on the identified features and earthquake damage data. In addition, the method includes operations for estimating, by the machine learning program, block damage caused by an earthquake, and for identifying a critical damage area (CDA) within the region. The CDA comprises a plurality of blocks geographically clustered that have a highest value of block damage. Additionally, the method includes an operation for causing presentation of the CDA within a map of the region.

20 Claims, 26 Drawing Sheets

(56) References Cited

U.S. PATENT DOCUMENTS

| | | | |
|---|---|---|---|
| 2007/0279239 A1* | 12/2007 | Lachenit | G08B 21/10 340/690 |
| 2008/0183393 A1* | 7/2008 | Rundle | G01V 1/008 702/15 |
| 2008/0270034 A1* | 10/2008 | Friedlander | G01V 1/008 702/15 |
| 2009/0061422 A1 | 3/2009 | Linke | |
| 2009/0204273 A1 | 8/2009 | Selius et al. | |
| 2009/0259581 A1 | 10/2009 | Horowitz | |
| 2010/0231919 A1* | 9/2010 | Schreiber | G01M 5/0091 356/460 |
| 2010/0238027 A1 | 9/2010 | Bastianini | |
| 2010/0280755 A1 | 11/2010 | Pillsbury | |
| 2011/0153368 A1* | 6/2011 | Pierre | G06Q 10/067 705/4 |
| 2011/0270793 A1* | 11/2011 | Bertogg | G06Q 40/06 706/50 |
| 2012/0280823 A1* | 11/2012 | Yang | G08B 21/10 340/669 |
| 2013/0024342 A1* | 1/2013 | Horowitz | G06Q 40/06 705/35 |
| 2013/0035859 A1* | 2/2013 | Guatteri | G08B 31/00 702/3 |
| 2013/0054200 A1 | 2/2013 | Kumarasena | |
| 2013/0216089 A1 | 8/2013 | Chen et al. | |
| 2013/0328688 A1 | 12/2013 | Price et al. | |
| 2014/0095425 A1 | 4/2014 | Sipple | |
| 2014/0110167 A1 | 4/2014 | Goebel et al. | |
| 2014/0188394 A1 | 7/2014 | Febonio et al. | |
| 2014/0249756 A1 | 9/2014 | Hsu et al. | |
| 2014/0266762 A1* | 9/2014 | Warren | G08B 27/00 340/690 |
| 2014/0316614 A1 | 10/2014 | Newman | |
| 2014/0358592 A1 | 12/2014 | Wedig et al. | |
| 2015/0073834 A1* | 3/2015 | Gurenko | G06Q 10/10 705/4 |
| 2016/0048925 A1 | 2/2016 | Emison et al. | |
| 2016/0163186 A1 | 6/2016 | Davidson et al. | |
| 2016/0239921 A1* | 8/2016 | Bray | G06Q 40/08 |
| 2016/0343093 A1 | 11/2016 | Riland et al. | |
| 2017/0254910 A1 | 9/2017 | Can et al. | |

OTHER PUBLICATIONS

"U.S. Appl. No. 15/246,919, Non Final Office Action dated Nov. 20, 2019", 21 pgs.

"U.S. Appl. No. 15/246,919, Non Final Office Action dated Jan. 30, 2019", 24 pgs.

"U.S. Appl. No. 15/246,919, Response filed Oct. 16, 2019 to Final Office Action dated Jul. 18, 2019", 18 pgs.

"U.S. Appl. No. 15/246,919, Examiner Interview Summary dated Sep. 17, 2019", 3 pgs.

"U.S. Appl. No. 15/246,919, Response filed May 21, 2019 to Non Final Office Action dated Jan. 30, 2019", 16 pgs.

"U.S. Appl. No. 15/246,919, Final Office Action dated Jul. 18, 2019", 19 pgs.

"U.S. Appl. No. 15/246,919, Notice of Allowance dated Apr. 9, 2020", 5 pgs.

* cited by examiner

Your experience of the earthquake

202

Shaking Strength:
How would you best describe the shaking?

[ Please select ... ▼ ]

Shaking Duration (seconds):
About how many seconds did the shaking last?

[                    ]

How did you react:

[ Please select ... ▼ ]

How did you respond:

[ Please select ... ▼ ]

Stand or Walk:
Was it difficult to stand and/or walk?

[ Please select ... ▼ ]

FIG. 2A

Was there any damage to the building?
Check all that apply.

204

☐ No Damage
☐ Hairline cracks in walls
☐ A few large cracks in walls
☑ Many large cracks in walls
☐ Ceiling tiles or lightning fixtures fell
☐ Cracks in chimney
☑ One or several cracked windows
☐ Many windows cracked or some broken out
☐ Masonry fell from block or brick wall(s)

FIG. 2B

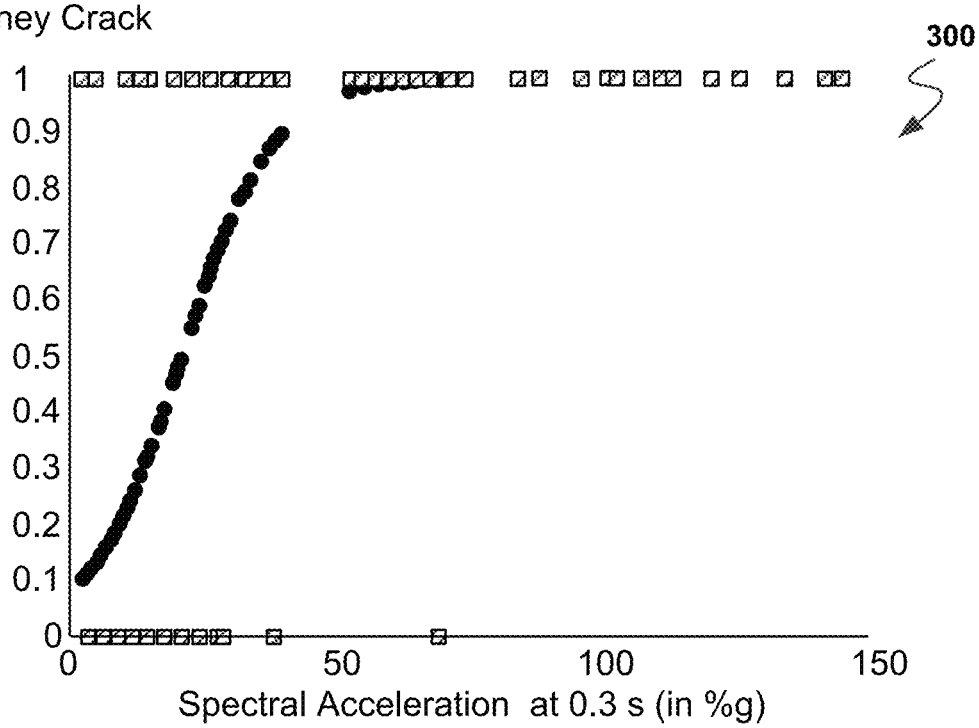
FIG. 3
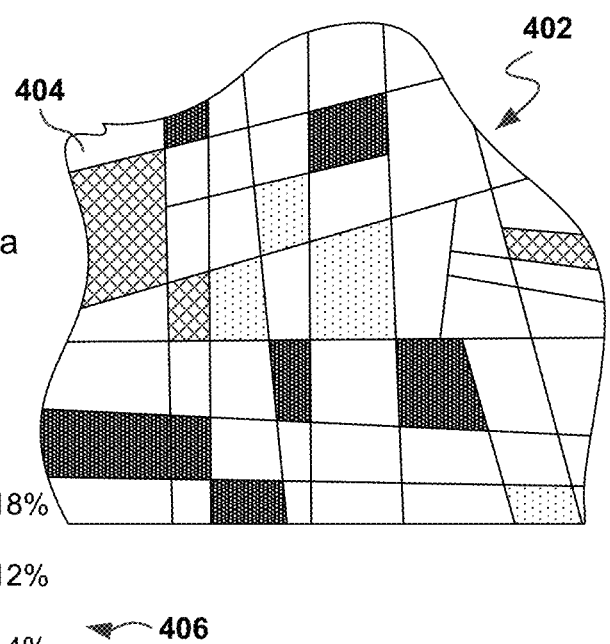
"Average BDI" represents the most probable damage state of a 'typical' building within that specific census sub-block
Census Sub-blocks
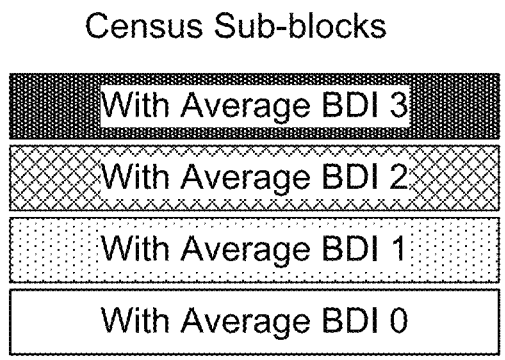
| With Average BDI 3 | 18% |
| With Average BDI 2 | 12% |
| With Average BDI 1 | 14% |
| With Average BDI 0 | 56% |
FIG. 4

|  Actual BDI | Predicted BDI | | | |
|---|---|---|---|---|
| | 0 | 1 | 2 | 3 |
| 0 | 172 | 23 | 0 | 0 |
| 1 | 64 | 137 | 2 | 0 |
| 2 | 3 | 7 | 97 | 0 |
| 3 | 0 | 0 | 1 | 6 |

FIG. 12

| Algorithm | Training | | Testing | |
|---|---|---|---|---|
| | F-Score | Error | F-Score | Error |
| Random Forest | 0.953 | 1.57% | 0.877 | 17.20% |
| Support Vector Machines | 0.834 | 19.55% | 0.879 | 17.03% |
| Neural Networks | 0.790 | 22.80% | 0.815 | 21.50% |

ANALYSIS OF STRUCTURAL-DAMAGE PREDICTIONS CAUSED BY AN EARTHQUAKE TO IDENTIFY AREAS WITH HIGH DAMAGE LEVELS

RELATED APPLICATIONS

This application is a continuation-in-part Application under 35 USC § 120 of U.S. patent application Ser. No. 15/246,919, entitled "Method and System to Predict the Extent of Structural damage," filed on Aug. 25, 2016, which claims priority from U.S. Provisional Patent Application No. 62/264,989, filed Dec. 9, 2015, entitled "Method and System to Predict the Extent of Structural Damage;" and from U.S. Provisional Patent Application No. 62/370,964, filed Aug. 4, 2016, entitled "Method and System to Predict the Extent of Structural Damage." All these applications are incorporated herein by reference in their entirety.

TECHNICAL FIELD

The subject matter disclosed herein generally relates to the processing of data. For example, the present disclosure addresses systems and methods to predict the extent of structural damage caused by natural phenomena (e.g., an earthquake) using performance-based engineering and machine learning.

BACKGROUND

Natural phenomena, such as earthquakes, flooding, and fires, may cause significant damage to life and property. Predicting the extent of such damage may assist in prioritizing emergency services to those most affected by the earthquakes, flooding, and fires.

BRIEF DESCRIPTION OF THE DRAWINGS

Various ones of the appended drawings merely illustrate example embodiments of the present disclosure and cannot be considered as limiting its scope.

FIG. 1 is a network diagram, according to some example embodiments, illustrating a network environment suitable for predicting structural damage caused by phenomena such as fire, earthquake, water, wind, or the like.

FIGS. 2A-2B show example embodiments of screenshots of an example graphical user interface (GUI) of selected "Did You Feel It" (DYFI) questions provided by the United States Geological Survey (USGS) web site.

FIG. 3 shows a chimney fragility curve, according to some example embodiments.

FIG. 4 illustrates the Block Damage Index (BDI) by city block, according to some example embodiments.

FIG. 12 shows a confusion matrix, according to an example embodiment, for predictions of damage for 512 testing points.

FIG. 13 shows a performance comparison of algorithms in accordance with some example embodiments.

DETAILED DESCRIPTION

Figure 1:
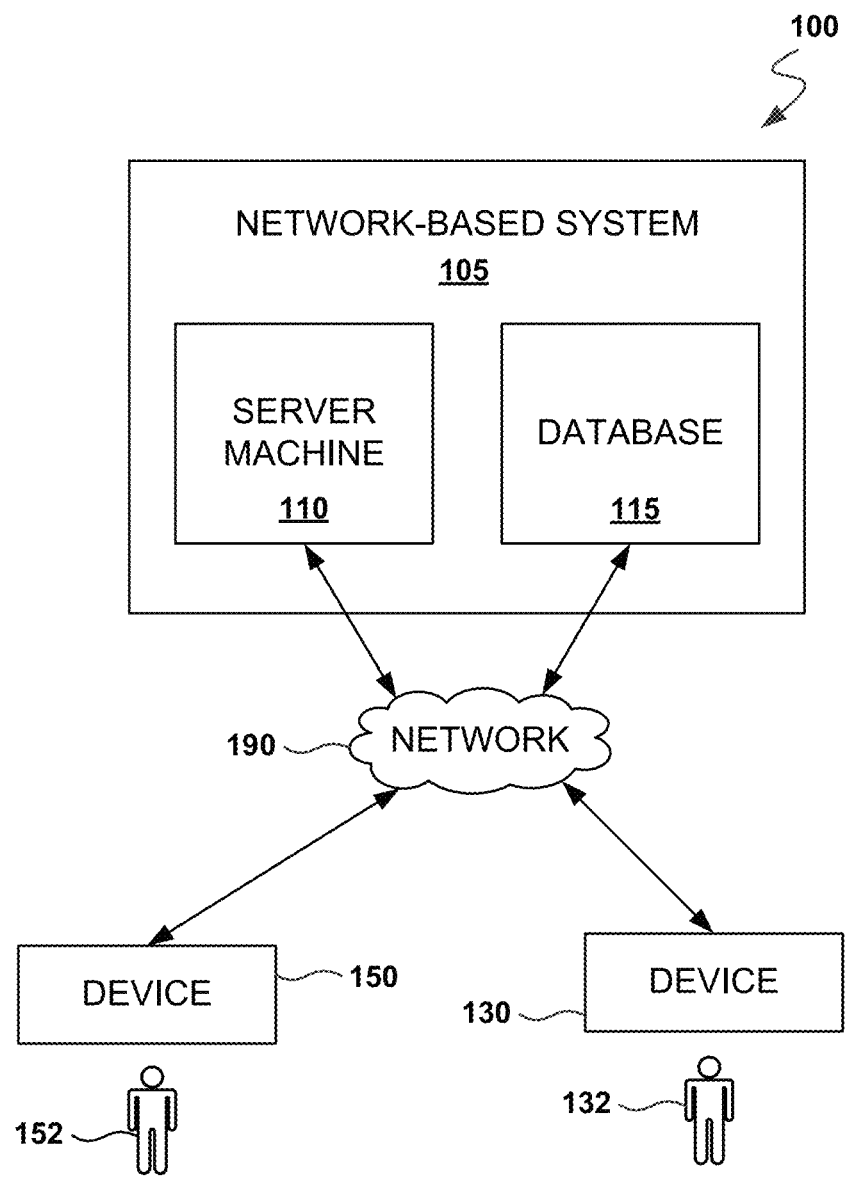

Example methods, systems, and computer programs are directed to determining cluster areas within a region having higher estimates of damage caused by an earthquake as compared to damage in nearby areas. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Predicting the scale and scope of damage as quickly as possible following an earthquake is beneficial in coordinating local emergency response efforts; implementing shelter, food, and medical plans; and requesting assistance from the state and federal levels. Additionally, estimating the damage for a hypothetical earthquake is beneficial in assessing household risk, planning for disaster response, establishing insurance rates, etc.

Example embodiments described herein apply machine learning to predict damage after a hypothetical disaster. Additionally, the estimated damage within a region is analyzed in order to find areas within the region that have higher damage than other nearby areas. A critical damage area (CDA) is defined as a cluster of blocks with a higher block damage index (BDI) than surrounding blocks or nearby blocks.

In addition, features known to influence how earthquakes affect structures (e.g., type of structure, amount of shaking, soil characteristics, structural parameters, etc.), are analyzed to compare the value of the feature (e.g., soil type) for buildings in the CDA against the value of the feature for buildings outside the CDA. If the differences in the values are statistically significant, then the feature is identified as a key feature for explaining the higher damage levels in the CDA.

The explanation of how some areas are more impacted by an earthquake is useful information for government officials in order to prepare for a major disaster. Government officials may take action, such as by implementing retrofits of buildings in the sensitive areas.

One general aspect includes a method including operations for identifying features associated with buildings within a region, and for training, by one or more processors, a machine learning program based on the identified features and earthquake damage data. The method also includes estimating, by the one or more processors using the machine learning program, block damage caused by an earthquake. The method further includes identifying, by the one or more processors, a CDA within the region. The CDA includes a plurality of blocks geographically clustered having a highest value of block damage. The method also includes causing, by the one or more processors, presentation of the CDA within a map of the region.

One general aspect includes a system including a memory having instructions and one or more computer processors. The instructions, when executed by the one or more computer processors, cause the one or more computer processors to perform operations including: identifying features associated with buildings within a region; training a machine learning program based on the identified features and earthquake damage data; estimating, using the machine learning program, block damage caused by an earthquake; identifying a critical damage area (CDA) within the region, the CDA including a plurality of blocks geographically clustered having a highest value of block damage; and causing presentation of the CDA within a map of the region.

One general aspect includes a non-transitory machine-readable storage medium including instructions that, when executed by a machine, cause the machine to perform operations including: identifying features associated with buildings within a region; training a machine learning program based on the identified features and earthquake damage data; estimating, using the machine learning program, block damage caused by an earthquake; identifying a critical damage area (CDA) within the region, the CDA including a plurality of blocks geographically clustered having a highest value of block damage; and causing presentation of the CDA within a map of the region.

FIG. 1 is a network diagram, according to some example embodiments, illustrating a network environment suitable for predicting structural damage caused by phenomena such as fire, earthquake, water, wind or the like. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 28. The server machine 110 may contain algorithms that manipulate the data received from the user devices 150 to make the data usable, or to format the data, for use by the database 115.

Also shown in FIG. 1 are two example users 132 and 152 that may enter, for example, earthquake damage data into associated user devices 130, 150. For example, the device 130 may be a desktop computer, a vehicle computer, a tablet computer, a navigational device, a portable media device, a smartphone, or a wearable device (e.g., a smart watch or smart glasses) belonging to the user 132. The user devices 130, 150 may generate one or more of the GUIs shown herein. The database 115 may include historic data on phenomena such as earthquakes, floods, fire damage, wind, etc., and includes built-environment data and natural-environment data.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 28. As used herein, a "database" is a data storage resource and may store data structured as a text file, a table, a spreadsheet, a relational database (e.g., an object-relational database), a non-relational database, a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

FIGS. 2A-2B show example embodiments of screenshots 202 and 204 of an example graphical user interface (GUI) of selected "Did You Feel It" (DYFI) questions provided in the website of the United States Geological Survey (USGS), a scientific agency of the United States government.

After a natural disaster, such as an earthquake, emergency response centers receive a large number of 911 calls. For example, in the magnitude 6.0 Napa earthquake, thousands of 911 calls were received, and it took several days for the response teams to address all those calls. These calls are prioritized on a first-come first-served basis. However, some of the calls were not for help, but were placed just to notify the authorities about the earthquake. Further, about the majority of the calls did not come from Napa itself, but from neighboring areas, because the most-damaged areas did not have working telephone networks. Part of the job for an emergency manager is figuring out whether a jurisdiction is proclaiming or not, e.g., if the corresponding agency qualifies for Federal Emergency Management Agency (FEMA) aid or presidential declaration. Some emergency managers use a technique called windshield tours, where the emergency managers go around their jurisdiction, typically in a slow-moving car, and use a paper-map and a binder to manually note down the damage. It may take them several weeks to figure out whether a particular jurisdiction is proclaiming. Moreover, the accuracies of the windshield tours are pretty low, e.g. in the Napa 2014 earthquake, it took emergency managers 90 days to decide which areas were proclaiming, and several areas were missed.

Emergency-response teams aim to help those in need quickly, but it is difficult to prioritize responses after a natural disaster. Embodiments presented herein provide valuable tools to emergency operation centers (EOCs), response teams (e.g., fire stations), disaster planning organizations, community leaders, other government institutions, corporations site managers, etc., by estimating where the damage has been greatest and providing easy-to-use interface tools to indicate where rescue should be prioritized.

There are many types of data that may be used for estimating earthquake damage. One type of data is people impressions after an earthquake. The website of the United States Geological Survey (USGS) has an online post-earthquake survey form called "Did You Feel It?" (DYFI) where respondents report what they felt and saw during an earthquake.

For example, screenshot 202 in FIG. 2A is a user interface that asks the respondent several simple questions regarding the earthquake, such as how strongly was the earthquake felt, how long did the earthquake last, how did the respondent react, etc. Screenshot 204 of FIG. 2B presents the respondent a list of possible damage events, with a checkbox next to each event. The respondent may then select the events associated with the earthquake, such as no damage was inflicted, there are hairline cracks in the walls, ceiling tiles or lighting fixtures fell, there are cracks in the chimney, etc.

The USGS computes a Community Decimal Intensities (CDI) value for each survey response using Dewey and Dengler procedures, aggregates the data, and ultimately reports the aggregate CDI value for each zip code or other geographic region of interest. Community Decimal Intensities (CDI) are not individual observations, but rather a measure of earthquake effects over an area.

In example embodiments, the CDI values computed for each response are considered to be a classification for machine learning. CDI values may be augmented by other damage indicators including post-disaster inspection reports (e.g., red, yellow, and green tagging data), aerial, or satellite imagery, etc. In example embodiments, the scope of analysis may be restricted to estimating damage to city blocks, or to single-family homes, or to commercial buildings, or to special buildings (e.g., hospitals, firehouses). Example embodiments may allow an individual homeowner, with limited knowledge of earthquake engineering, to determine a damage state across a range of seismic hazard levels as well as calculate expected losses from each hazard level. Further, an expected annual loss may be determined that may be useful for making informed decisions regarding household financial planning. The damage estimates for single homes may be aggregated at the community or block level in order to use as a planning tool for emergency responders and city planners, for example. Decision makers may be better informed to make planning and policy decisions based on the probabilistic-based risk methods used to estimate structural damage presented herein.

A census block is the smallest geographic unit used by the United States Census Bureau for tabulation of 100-percent data (data collected from all houses, rather than a sample of houses). Census blocks are typically bounded by streets, roads, or creeks. In cities, a census block may correspond to a city block, but in rural areas where there are fewer roads, blocks may be limited by other features. The population of a census block varies greatly. As of the 2010 census, there were 4,871,270 blocks with a reported population of zero, while a block that is entirely occupied by an apartment complex might have several hundred inhabitants. Census blocks are grouped into block groups, which are grouped into census tracts.

In one example embodiment, a city block, also referred to herein as a block, is defined by the census block, but other example embodiments may define a city block as a different area, such as a census block group or a census tract.

In general, a block is a continuous region delimited by a geographic area, and each block may have the same size or a different size. For example, the block may range in size from one acre to ten acres, but other acreage may be used. In high-density population areas, the block may be as small as half an acre, but in less populated areas, the block may include 100 acres or more. A block may include zero or more structures.

In some example embodiments, to simplify definition, the blocks may be defined by a grid on a map, where each square or rectangle of the grid is a block. If a building were situated in more than one block, then the building would be considered to be in the block with the largest section of the building. In other example embodiments, the block is defined by the application developer by dividing a geographic area into a plurality of blocks.

Further, for example, immediately following an earthquake, a disaster response center within a community may be able to examine the estimate for the extent and severity of the damage to determine how homes (or any other physical structure) in their community are affected, and subsequently tailor response and recovery efforts based on the estimates.

The performance-based earthquake engineering (PBEE) methodology developed by the Pacific Earthquake Engineering Research (PEER) Center follows a logical, stepwise approach to performance assessment and subsequent damage and loss estimates of a structure due to an earthquake. The framework is rigorous, probabilistic, and utilizes inputs from disciplines such as seismology, structural engineering, loss modeling, and risk management to ultimately generate data of seismic consequences.

In an example embodiment, DYFI data for past California earthquakes is accessed to train the damage-estimation algorithm. The DYFI data includes information from events with at least 1,000 responses from 50 seismic events, with a bias towards more recent events, events centered near high-density populated areas, and events of larger magnitudes. The supplied data spans from magnitudes 3.4 (San Francisco Bay area, April 2011) to 7.2 (Baja, April 2010). It is however to be appreciated that DYFI data is merely an example of data that could be used, and that data from any other geographical areas or sources may also be used and analyzed. Another source data may be the Earthquake Clearinghouse maintained by the Earthquake Engineering Research Institute, or other repositories containing red, yellow, and green tagging data.

Features collected from the DYFI dataset include house location, damage state (CDI), and description of home damage. Another source of data is the USGS, which provides data including earthquake magnitude, duration of shaking, epicenter location, spectral acceleration (e.g., shakemap), soil type, elevation, and spectral acceleration at various return periods. Another source of data is the U.S. Census, which provides data for features such as house size, house age, and house price.

Further, features may be derived from other types of data by combining or calculating two or more pieces of information. For example, derived features include the probability of entering five different damage states (Hazus from the FEMA technical manual), spectral displacement, and probability of chimney cracking.

It is noted that Vs30 is a parameter that describes soil conditions. A ground motion parameter Sd may be calculated using a computing device as follows:

$$Sd = Sa\left(\frac{T}{\pi}\right)^2$$

Where Sa is spectral acceleration, a ground motion intensity parameter of an earthquake, and T is an assumed structural period (e.g., 0.35 s or 0.4 s, but other values are also possible). The assumed structural period may be determined from Hazus guidelines depending on the size of the building structure (e.g., home).

FIG. 3 shows a chimney fragility function 300, according to some example embodiments. A fragility function, also referred to herein as a fragility curve, is a mathematical function that expresses the probability that some undesirable event occurs (e.g., that an asset—a facility or a component—reaches or exceeds some clearly defined limit state) as a function of some measure of environmental excitation (typically a measure of acceleration, deformation, or force in an earthquake, hurricane, or other extreme loading condition). The fragility function represents the cumulative distribution function of the capacity of an asset to resist an undesirable limit state.

For example, a fragility function for a feature (e.g., a chimney, a foundation, the integrity of the structure, a window, etc.) associated with a building expresses the probability that the feature will suffer damage after an earthquake based on the shaking of the building caused by the earthquake.

The fragility curve depends on many parameters, such as structural type (construction material), size, seismic zone, and seismic design code used (which is a function of location and age of the structure). In some example embodiments, the damage may be labeled as N (none), S (slight), M (moderate), E (extensive), and C (complete). In an example embodiment, P (no damage) and P (slight damage) may use Sd as an input along with stored fragility parameters. The probability of no damage for each of five damage states may be computed using the Hazus fragility curve parameters (e.g., using Hazus Technical Manual). The probable damage states for structural, non-structural drift-sensitive, and non-structural acceleration-sensitive components may be computed separately using one or more computing devices.

It is noted that fragility functions are often represented as two-dimensional plots, but the fragility functions may also be created using 3 or more dimensions, in which case, the effect of two or more features are combined to assess the damage state. Further, fragility functions are not static, and may change over time. Natural environmental conditions changes (e.g., water table and climate), and man-made conditions changes (e.g., structural retrofits and new construction) may require fragility functions to be modified over time to facilitate more accurate damage predictions. Fragility functions for a given structure may also be changed based on damage that the given structure may have sustained due to a previous earthquake. Modified fragility functions may then be used to estimate structural damage during an aftershock, resulting in more accurate damage predictions than predictions from unmodified fragility functions.

As discussed above, DYFI data may include information about observed damage to walls, chimneys, etc. The probability of a chimney cracking may be computed by sorting DYFI responses into two categories: whether any type of chimney damage was reported or not. A sigmoid fragility function may then be fit through logistic regression such that the independent variable is spectral acceleration Sa at a structural period of, for example, 0.3 seconds, and the dependent variable is the probability of chimney cracking Pcc. In some example implementations, the sigmoid function is approximated by a cumulative lognormal function.

Fragility function 300 is an example chimney fragility curve. In an example embodiment, a probability of 1 corresponds to Sa values that may have driven chimney damage. The example chimney fragility curve, a sigmoid curve, is fairly steep, indicating there is a fairly abrupt transition from no damage to some damage for increasing values of spectral acceleration.

An example empirical fragility curve may be derived using the following equation:

$$Pcc = 0.5 + 0.5 * \text{Erf}\left(\frac{\ln Sa - \mu}{(2\sigma)^2}\right)$$

Where Pcc is the fragility estimation of the probability that the structure's chimney is cracked given a spectral acceleration, Sa is the ground-motion intensity parameter, Erf is the complementary error function of the lognormal distribution, μ is the mean, and σ is the standard deviation of the variable's natural logarithm. In this example, μ is 3.07 and σ is 0.5.

FIG. 4 illustrates the block damage index (BDI) by city block 404, according to some example embodiments. After entering basic earthquake information, which may be an automated step, like epicenter latitude, longitude, and magnitude, the web application may generate maps, each of which may provide a predicted damage state distribution of neighboring areas (e.g., 100 km from the epicenter) in one example.

Despite the highly uncertain nature of earthquake engineering problems, augmenting the PBEE framework with machine learning results in acceptable accuracy in damage prediction. In an example embodiment, the SVM provides at least a plausible representation of damage. In fact, this means that machine learning may replace waiting for DYFI data when estimating community-wide damage. Further, this approach may, in certain embodiments, fill in geographic gaps in community-wide damage assessment, giving near-immediate and fairly accurate results. Situational awareness immediately after any type of natural disaster may be enhanced, and resource allocation of response equipment and personnel may be more efficient at a community-level following this approach. Although some example embodiments described herein are with reference to California, it should be noted that the methods and systems described herein may be applied to any geographical area.

In an example embodiment, comprehensive housing data may improve damage-state estimates. Additionally, the methodology described herein may apply to the analysis of any type of structure (or structures), taking into account their current seismic health, type of construction material, and lateral resisting system. Example embodiments may allow for better damage analysis for the community, including businesses, mid-rises, etc., and thereby provide a more accurate estimate of loss. It is however to be appreciated that the methods and systems described herein may also be applied to predicting fire damage, flood damage, wind damage, or the like.

Empirical equations (extracted from parametric learning techniques) relating damage state to the input features are used in some example embodiments. In an example embodiment, a Monte Carlo method is used to obtain data for higher CDI values since there are few training data available. In certain circumstances, shaking intensity values of large events at other parts of the world (e.g., Tohoku, Japan, 2010), which are not necessarily in a similar scenario, are applied using transfer-learning techniques to extrapolate to other regions. Using transfer-learning techniques, the prediction of damage states for severe catastrophes is enhanced.

As the algorithms estimate damage after an earthquake, as discussed in more detail below, in some example implementations, an estimate of damage is provided by city block 404 in a map. In the example embodiment of FIG. 4, the map shows the damage estimate 402 by city block 404, and the damage is represented by the shading (or color) of the city block 404. It is noted that the terms "damage estimate" and "damage prediction" are used herein to denote the output of the machine-learning algorithm, the difference being that "damage estimate" refers to an event that has already taken place (e.g., a new earthquake) while "damage prediction" refers to an event that has not taken place yet (e.g., effects of a machine-simulated earthquake), although the term "prediction" may sometimes be used to estimate the damage after an earthquake since damage data is not yet available.

In general, a large variation may be expected in observed damage states from earthquakes. In an example embodiment, and illustrated in FIG. 4, damage is classified into four damage states, and each damage state is given a Block Damage Index (BDI) label 406 in lieu of a CDI label. Depending on the level of precision desired, the number of classifications and the scaling system may change, but in general, this is a reasonable approach based on the exclusivity and differentiability of each of the four damage states. In one example implementation, BDI labels 406 are defined as follows:

BDI=0 for CDI≤4;
BDI=1 for CDI≤7;
BDI=2 for 7<CDI≤9; and
BDI=3 for CDI>9.

In one example implementation, each BDI is assigned a color for the user interface: 0 is green, 1 is yellow, 2 is orange, and 3 is red, but other color mappings are also possible. For each city block 404, the BDI represents the most probable damage index of a typical building within that specific city block 404. In one example embodiment, the typical building is calculated by averaging the data for the buildings in the city block 404.

In some example embodiments, in a short amount of time after an earthquake (e.g., 15 minutes), a damage estimate 402 is provided by city block 404. These estimates 402 may be used by the EOC to prioritize rescue operations. In other solutions, EOCs utilize a heat map of 911 calls, but this may be misleading because the worst-damaged areas will not have phone service.

In some example embodiments, a BDI of 3 for a city block 404 does not mean that all the buildings in the block have a damage index of 3. Different builders may have different structures, ages, etc., so having a total city collapse may be infrequent. A city block is said to have a BDI of 3 when at least a predetermined percentage of buildings in the block have a damage index of 3, such as, for example, when at least 10% of the buildings in the block have damage index of 3. The percentage threshold may be adjusted and vary between 1 and fifty percent or some other greater value.

In one view, the operator may change the percentage threshold. For example, if the operator wants to see all the city blocks 404 with at least one building with a damage index of 3, the threshold may be lowered to a very small number, such as 0.01%.

Figure 5:
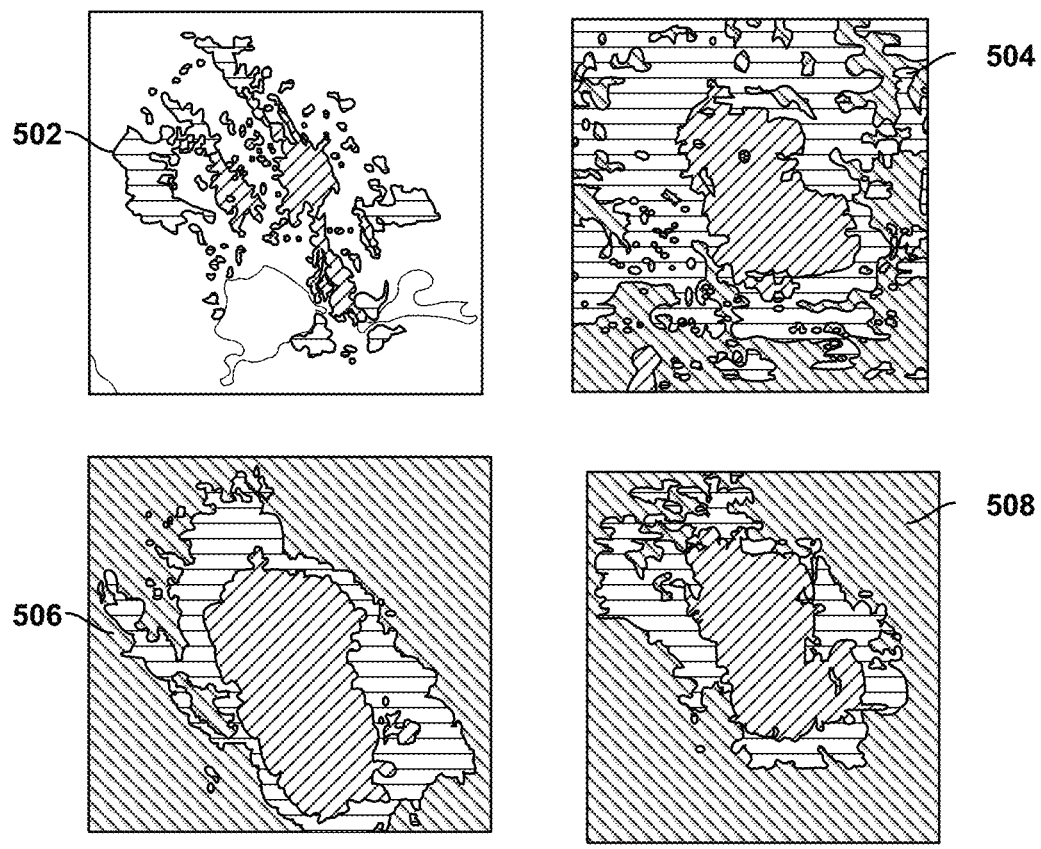
FIG. 5 shows an example graphical representation comparing DYFI data to Random Forest (RF), neural networks (NN) BDI, and Support Vector Machines (SVM) BDI damage-prediction results of the August 2014 (Napa) earthquake, according to one example embodiment.

FIG. 5 shows an example graphical representation comparing actual DYFI data 502 to RF 504, NN 506, and SVM 508 BDI damage-prediction results of the August 2014 (Napa) earthquake, according to one example embodiment. Machine learning is a field of study that gives computers the ability to learn without being explicitly programmed. Machine learning explores the study and construction of algorithms that may learn from and make predictions on data. Such machine-learning algorithms operate by building a model from example inputs in order to make data-driven predictions or decisions expressed as outputs. Although example embodiments are presented with respect to a few machine-learning algorithms, the principles presented herein may be applied to other machine-learning algorithms.

In some example embodiments, different machine-learning algorithms may be used. For example, Random Forest (RF), neural networks (NN), and Support Vector Machines (SVM) algorithms may be used for estimating damage. More details are provided below regarding the use of machine-learning algorithms with reference to FIGS. 9 to 15. In some example embodiments, ensemble methods may be utilized, which are methods that utilize multiple machine-learning algorithms in parallel or sequentially in order to better utilize the features to predict damage.

RF is robust in dealing with outliers, such as variation in damage states of nearby points, at the expense of relatively less predictive power. Moreover, RF may be good at ignoring irrelevant data. SVM may be considered because of its higher accuracy potential and theoretical guarantee against overwriting. NN may be considered because NN produces an equation relating damage with the algorithm features. This equation could then be used to get empirical relationships between damage and features.

After implementing RF, SVM, and NN algorithms, damage predictions for one example earthquake were compared to the actual DYFI data. FIG. 5 shows a graphical comparison of the actual DYFI data 502 to estimates given by RF 504, NN 506, and SVM 508, for the August 2014 (Napa) earthquake. It may be observed that the distribution of the damage states compares well with the actual DYFI data 502 distribution. In addition, the algorithms appear to be robust; the algorithms calculated damage states for regions where no DYFI response was recorded. This may be helpful in areas where the community is not able to access DYFI quickly after an earthquake due to lack of connectivity or where significant damage is caused by the earthquake. It is noted that a boundary between the lower two damage states is much more refined in SVM 508 than RF 504 due to SVM's resistance to over-fitting. Hence, SVM was considered to be a good machine-learning model for this example earthquake.

It may be reasonable to assume that the general scope of damage and loss is fairly similar within the same damage state. A similar assumption may be made in the PBEE approach, and structures are said to be in the same damage state if they would undergo the same degree of retrofit measures. Example tuning parameters for SVM, C (penalty) and g (margin) may also be determined.

Figure 6:
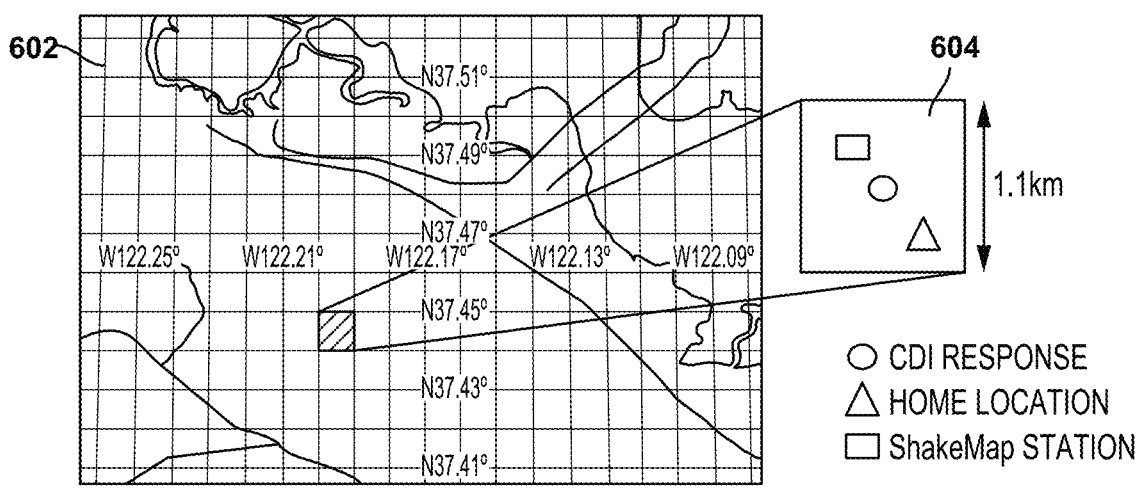
FIG. 6 shows an example embodiment for aggregating data from multiple sources to the same locations using a nearest neighbor function.

FIG. 6 shows an example embodiment for aggregating data from multiple sources to the same locations using a nearest neighbor function. In an example embodiment, a final stage of data pre-processing is performed to eliminate any skewness/bias of the data towards lower to mid-level CDIs (e.g., below 8). Approximately equal numbers of data points pertaining to each damage state may make learning more productive and effective in future predictions. Monte Carlo simulation may be used in order to increase the amount of data points for higher CDIs (e.g., above 8). The data may then be randomized and features may be scaled, for example, between 0 and 1. This scaling may allow the algorithm to treat each feature equally and avoid the possibility of a skewed dataset. In some example embodiments, an "in-poly" function is used to geographically associate features within boundaries, e.g., a seismic zone or a city block, particularly when the block has an irregular shape.

In an example embodiment, at a conclusion of a pre-processing phase, only the most accurate data spanning the entire range of CDIs may remain. In an example embodiment, this remaining data may define or form the training dataset. Map 602 in FIG. 6 is a satellite map of an area, which is subdivided into square areas. If the operator zooms in on the map 604, additional points of interests are identified, such as the location of the CDI response center, the location of a particular home, or a ShakeMap station.

Figure 7:
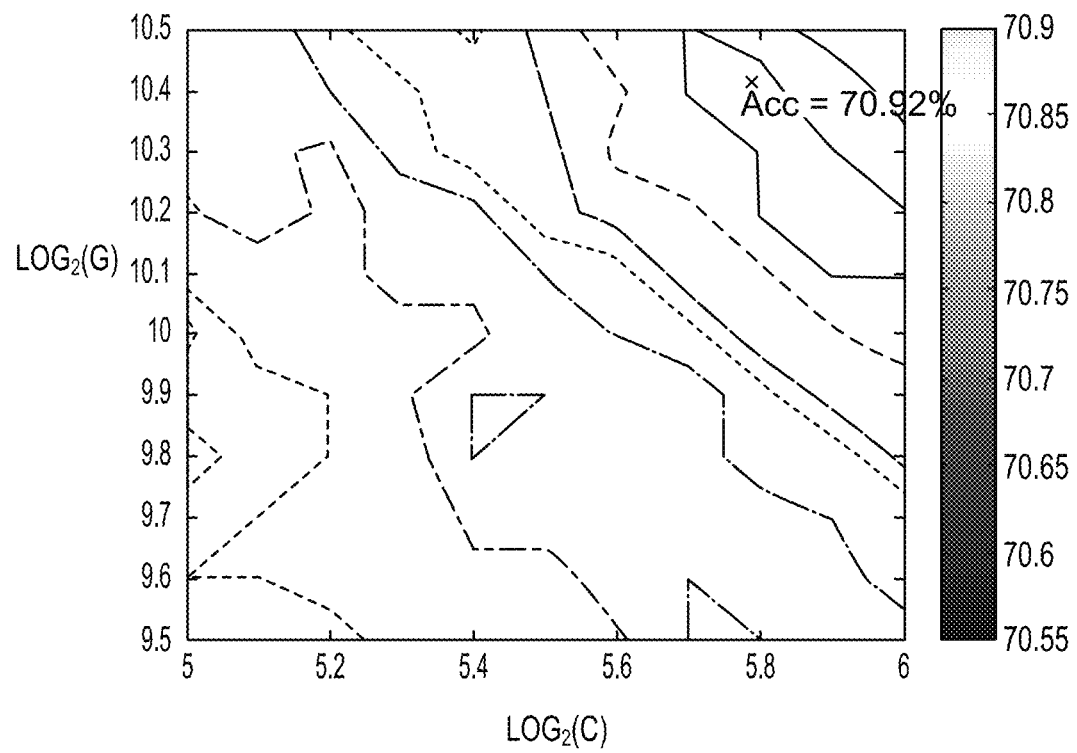
FIG. 7 shows an example cross-validation contour plot for a preliminary dataset, according to some example embodiments.

FIG. 7 shows an example cross-validation contour plot for a preliminary dataset, according to some example embodiments. Several cross-validation contour plots were created as an example of tuning the model. Once the training set was solidified and the sequence of algorithms were chosen, tuning was done in order to prevent over-fitting or under-fitting data when the model is used to predict damage following the next earthquake. In the example plot, the best accuracy is about 70.92%, occurring when C=5.8 and g=10.4. A Gaussian kernel is chosen by way of example as the best fit after experimenting with linear, polynomial and other RBF kernel options.

In an example embodiment, forward and backward search methods are used to determine which features contribute more than others to accurate damage estimation. In an example embodiment, the parameters Vs30, Sa, Sd, P (no damage), P (slight damage), and P (chimney damage) were used.

Figure 8:
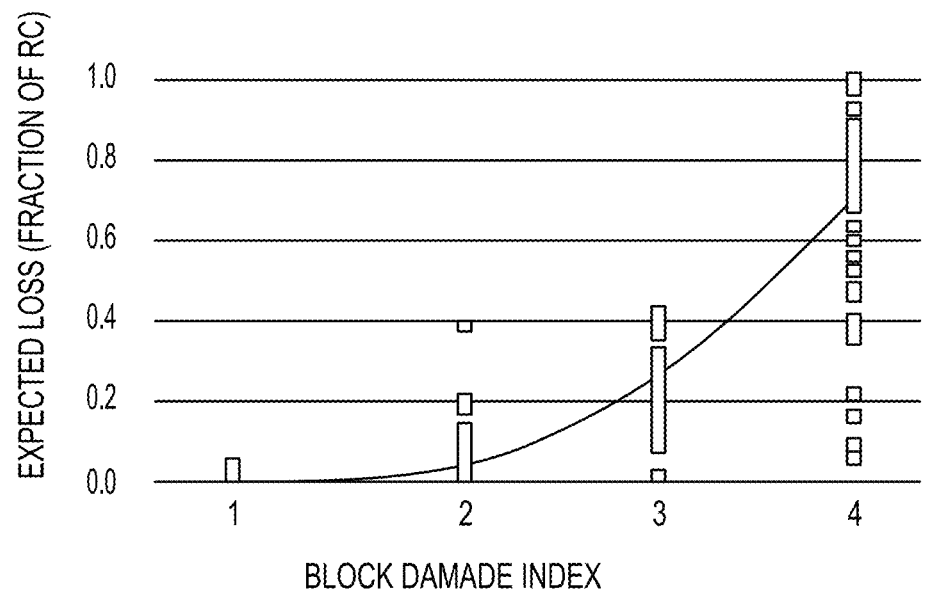
FIG. 8 shows an expected loss of an example home curve, according to some example embodiments.

FIG. 8 shows an expected loss of an example home curve, according to some example embodiments. In some example embodiments, the performance-based earthquake engineering approach is used to calculate financial loss from structural damage using a damage ratio and the structure's replacement value. In an example embodiment, expected values of economic loss and recovery time are calculated. For example, using the entire training set, repair cost ratios from Hazus are used for the calculations.

To calculate the expected loss, a weighted sum of the loss, given the damage state and the probability of being in each Hazus damage state, may be determined through a weighted sum technique. In an example embodiment, structural, non-structural drift-sensitive, non-structural acceleration-sensitive, and contents are considered separately. The conditional loss parameters may be adopted from the Hazus technical manual.

The expected loss of the home may be defined as the sum of expected losses for structural and non-structural elements, not including contents. A similar plot may be developed for expected loss of contents. Expected annual loss (EAL) for both home and contents may be calculated by numerical integration across the hazard curve from, for example, 0.01 g to 5.0 g using a step size of 0.01 g. Recovery time may be computed in a similar fashion as expected losses. Recovery parameters may be obtained from the Hazus technical manual, and include not only construction time, but also time to procure financing, design, decision making, or the like. A mean and standard deviation of loss and recovery time at each BDI may be determined and applied to each respective BDI prediction. Additionally, loss estimates may be aggregated at the block level and displayed on a map or in a report.

Figure 9:
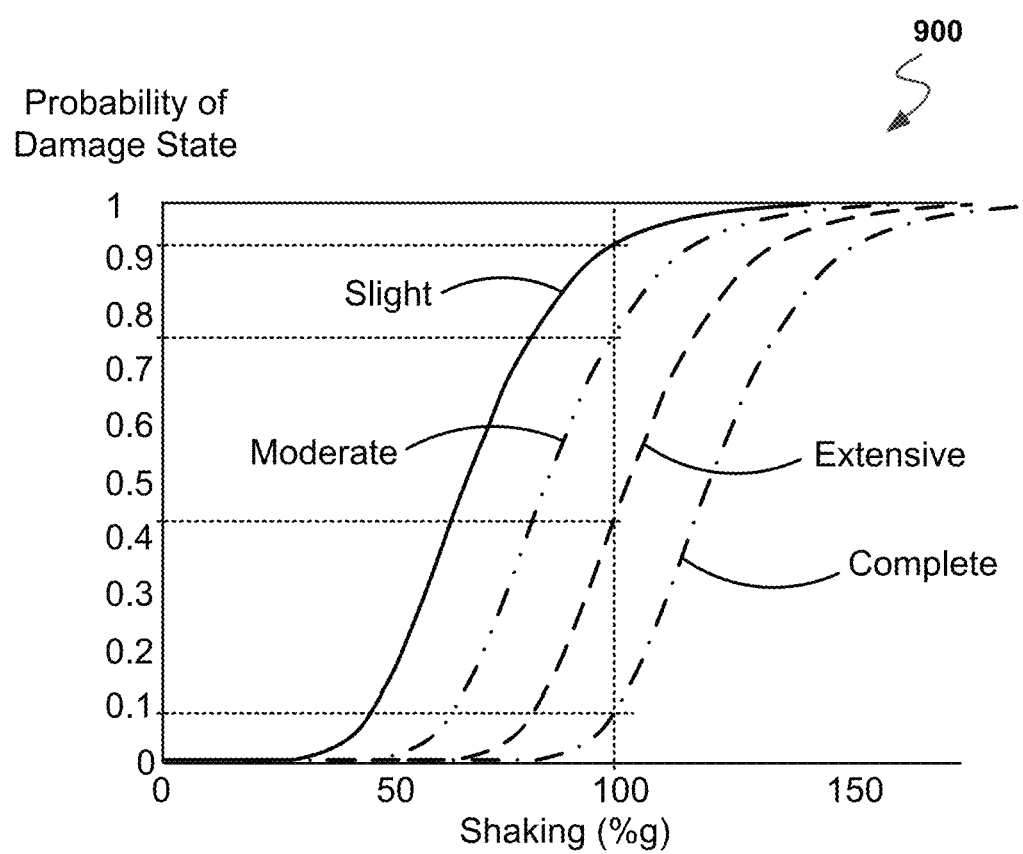
FIG. 9 shows fragility functions for different damage index levels, according to some example embodiments.

FIG. 9 shows fragility functions 900 for different damage index levels, according to some example embodiments. As discussed above, the fragility functions provide the probability of damage state as a function of the shaking. FEMA defines a building type framework with up to 252 types of buildings, and each building within the region is assigned to one of these 252 types. For example, the types may be based on construction material, number of stories, etc., and one type is defined for two-story wooden structures. Further, buildings within one or more blocks may be assigned to additional building types above and beyond the FEMA framework, as applicable, if needed in order to better represent the response of that building to the effects of earthquakes or other disasters.

Each structure may respond differently to an earthquake; therefore, a fragility function is calculated for each type. In the example embodiment of FIG. 9, fragility functions 900 are defined for one building type for the four different types of damage. Based on that, the probability of being in one of the five damages states (none, slight, moderate, extensive, or complete) or a state of higher damage may be determined. For example, for a shaking of 1 g, the probability of no damage is 8%, the probability of slight damage or worse is 25%, the probability of moderate damage or worse is 58%, the probability of extensive damage or worse is 91%, and the probability of complete damage is 9%. This means that for the same shaking, the probability of higher damage is lower, in general.

In one example embodiment, these fragility curves are used to estimate the damage for each building type once the shaking of the building is determined according to its location. However, there are more factors that affect damage besides building type, such as the soil type, year built, building price, etc. For example, not all the two-story wooden buildings have the same price and are built with the same quality. Therefore, the damage resulting to these buildings may vary significantly. Thus other example embodiments utilize more features, besides building type, to estimate damage.

Machine-learning algorithms work well for predicting damage because these algorithms analyze a plurality of features and how the features correlate to the damage inflicted. For example, machine-learning algorithms may take into account hundreds of features to estimate damage.

Figure 10:
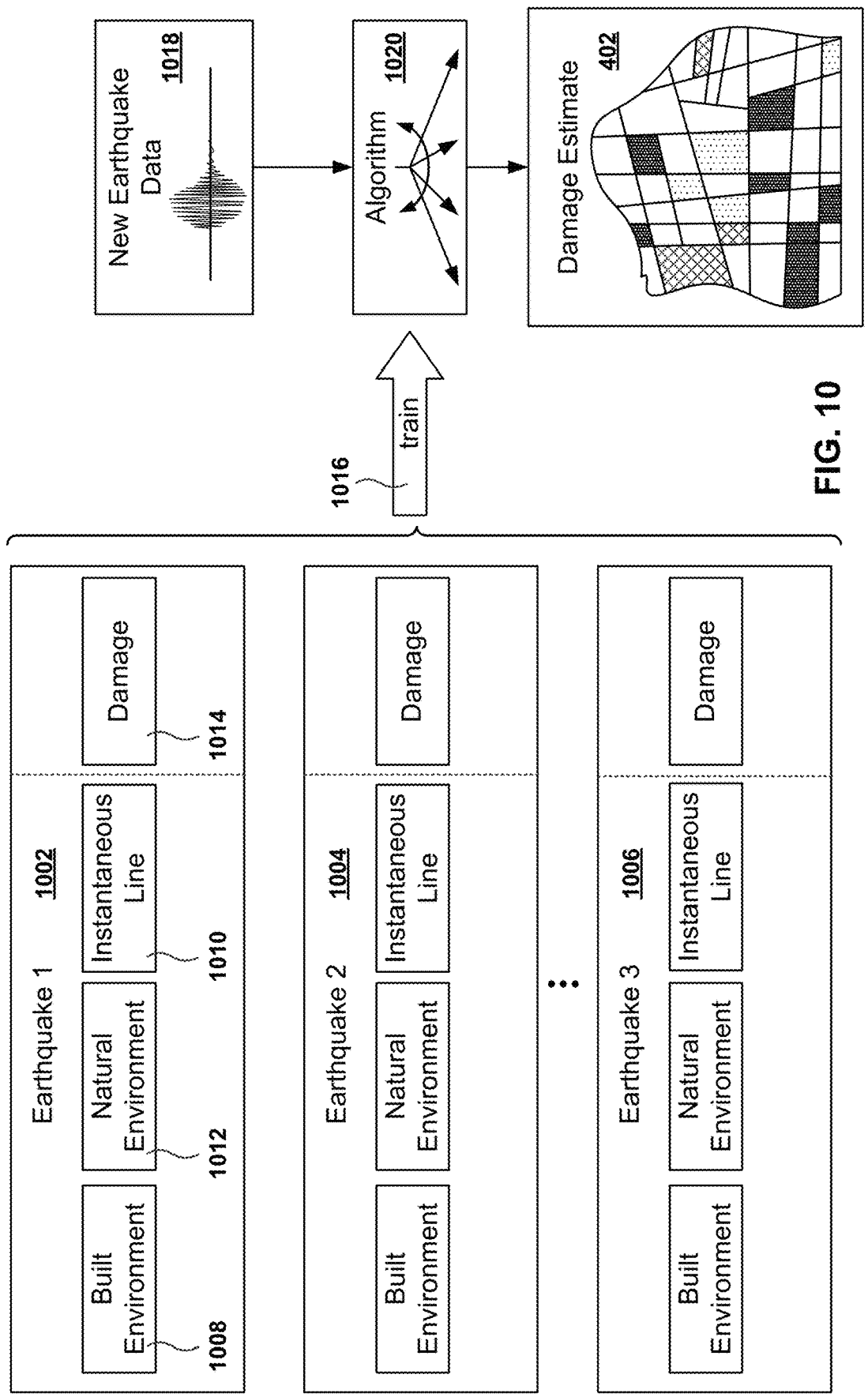
FIG. 10 shows example embodiments illustrating the use of a machine-learning algorithm for predicting earthquake damage.

FIG. 10 shows example embodiments illustrating the use of a machine-learning algorithm for predicting earthquake damage. In some example embodiments, the data from a plurality of earthquakes 1002, 1004, 1006, is collected to train the algorithms. For example, one of the data sources could be building tagging. After an earthquake, building inspectors visit buildings and assign a tag on the severity of the damage to the building. These tags may be used to modify the BDI predictions in real-time.

Another type of data, as discussed earlier, is DYFI data regarding people's impressions of the damage, which may come through entries on a website or through telephone calls. This information provides data for different types of homes and for different types of earthquakes, and this data is geo-coded, including latitude, longitude, and a measurement of damage. New DYFI data points obtained after the earthquake may be used as real-time data input to enrich and improve the initial real-time BDI predictions. Other real-time data sources include smart-phone applications, manual user-inputs, building tagging data, satellite images, drone images, etc. These additional data sources may be used to modify and improve the accuracy of the initial BDI predictions as time progresses after the earthquake, e.g., hours of days later. In addition, processes such as belief propagation, online learning, and Markov models may be used in conjunction with real-time data to improve the BDI predictions.

In example embodiments, pre-processing of data for algorithm training is performed to fit within a single-family home scope (or any other selected building structure), and as example DYFI responses may not list a location of the building structure during an earthquake. In example embodiments, when an analysis is performed on a single family home, data not pertaining to single-family homes may be removed. Next, in an example embodiment, all response data that is not geo-located by USGS may be removed to enhance precision. In an example embodiment, the data from 50 earthquakes provided in the database, (e.g., with at least 1000 responses remaining), were used for the training set. For example, for privacy constraints, USGS data may publicly report DYFI data with two-digit latitude and longitude accuracy, meaning the geo-located point could be up to about 0.6 km away from the true location of the structure affected by an earthquake. Tagging data, on the other hand, may be identifiable to the exact structure.

Further, spectral acceleration information from USGS's ShakeMap website may be obtained for each of the earthquakes. These ShakeMap files may include not only data from strong motion stations throughout the state, but also interpolated spectral ordinates using weighted contributions from three attenuation functions at regular, closely-spaced intervals. Since the locations of many of the machine-learning features described herein, such as spectral acceleration, elevation, soil, etc., are available to four-decimal latitude and longitude accuracy, the two-decimal accuracy of DYFI data may not exactly align with the data from the other sources. To remedy this geographic disparity, using a nearest neighbor function, a nearest value of spectral acceleration may be assigned to each DYFI response. If there was no ShakeMap data point within 1 km of a DYFI response, the DYFI response may be excluded from the training set. Similarly, when appropriating housing data to a DYFI response, the nearest neighbor function may be used.

In some embodiments and as shown in FIG. 10, three types of features are identified: built environment data 1008, natural environment data 1012, and instantaneous line data 1010, also referred to as sensor data. Built environment data 1008 includes data regarding anything built by humans, such as buildings, bridges, roads, airports, etc. Built environment data 1008 includes the type of building, age, size, material, type, number of stories, fragility functions, etc.

"Natural environment" refers to objects or structures present in nature, such as soil, damns, rivers, lakes, etc. Natural environment data 1012 includes features related to soil, such as soil type, soil density, soil liquefaction; data related to water table; elevation, etc. For example, one soil parameter is the shear wave velocity of soil Vs30. This data may be obtained from USGS or FEMA.

Further, instantaneous line data 1010 refers to sensor data obtained during an earthquake, such as by data obtained from earthquake seismographs, which may be operated by the USGS or by other entities that make the information openly available. The shaking information is obtained through one or more scattered measuring stations, but the shaking is estimated throughout the region of interest utilizing ground-motion prediction equations, which predict how much the ground is moving throughout the different locations. Sensor data may also be obtained from accelerometers or other sensors placed on buildings and infrastructure. Further, data from accelerometers in smartphones, laptops, and other computing devices, may be incorporated as instantaneous line data. Both S waves and P waves may be used in real-time as instantaneous line data.

Level of damage 1014 is the variable that is to be estimated or predicted. For training, damage data is associated with the different input features to establish the correlation between each feature and damage. In some example embodiments, the estimated damage is presented in the form of BDI damage, i.e., 0 (e.g., no damage), 1, 2, or 3 (e.g., complete collapse of the structure), but other types of damage assessment categories may also be utilized (e.g., foundation damage).

Once all the data is collected, the machine-learning algorithm training 1016 takes place, and the algorithm is ready for estimating damage. When a new earthquake occurs, the new earthquake data 1018 is obtained (e.g., downloaded from the USGS website). The machine-learning algorithm 1020 uses the new earthquake data 1018 as input to generate damage estimate 402.

Figure 11:
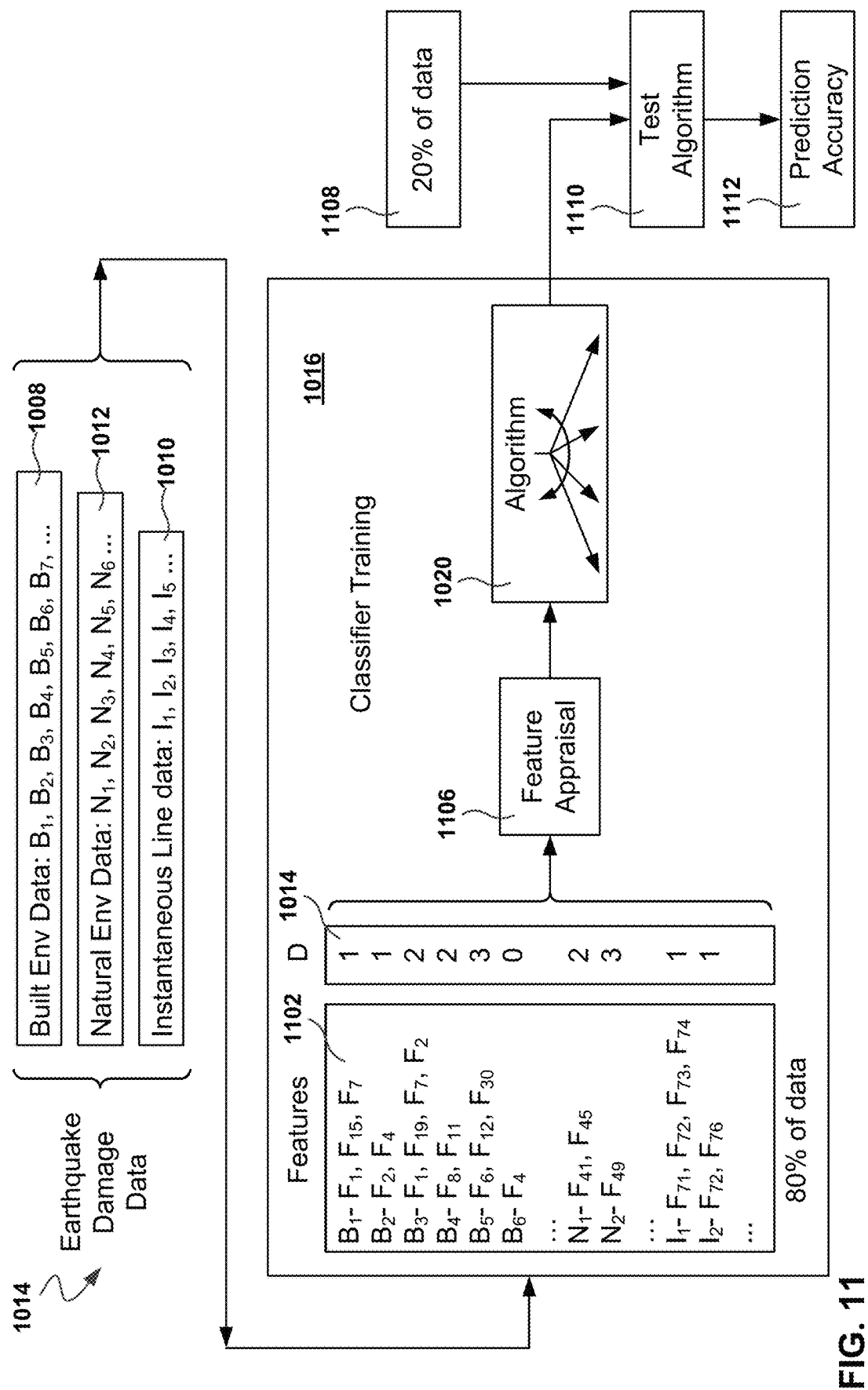
FIG. 11 illustrates a method, according to some example embodiments, for training the algorithm to predict damage.

FIG. 11 illustrates the method, according to some example embodiments, for machine-learning algorithm training 1016 to predict damage, also referred to herein as algorithm learning. As discussed above, in some example embodiments, the training set data includes built environment data 1008, natural environment data 1012, and instantaneous line data 1010. Each of these categories includes one or more types of data, such as $B_1$, $B_2$, $B_3$ for built environment data 1008; $N_1$, $N_2$, $N_3$ for natural environment data 1012; and $I_1$, $I_2$, and $I_3$ for instantaneous line data 1010. For example, $B_1$ is data for a particular house and may include DYFI information such as a crack on the chimney, or any other damage information for the house. Further, for the instantaneous line data 1010, archived live data is used for the training. The data may correspond to one or more earthquakes. In one example embodiment, the data for 52 different earthquakes is utilized.

Each of the data points is correlated to one or more features 1102 and a level of damage 1014. This is the training set for appraising 1106 the relationship between each of the features and the damage caused. Once the appraisal is done, the algorithm 1020 is ready for estimating or predicting damage.

In some example embodiments, part of the data for the level of damage 1014 is not used in the training phase (e.g., 1016), and instead is reserved for testing the accuracy of the algorithm. For example, 80% of the available data is used for training the algorithm, while 20% of the data 1108 is used for testing the algorithm 1110. Different amounts of data may be reserved for testing, such as 10%, 30%, etc., and different segments of the data may be reserved for testing.

In order to test the algorithm 1110, 20% of data 1108 is fed the algorithm as if the data 1108 was originated by a new earthquake. The algorithm then presents damage estimates, and the damage estimates are compared to the actual damage to determine prediction accuracy 1112 of the algorithm.

It is noted that some of the data is available at the building level (e.g., damage inflicted on a specific building) but the predictions, in some example embodiments, refer to damage at the block level.

Sometimes, there is no data for all the buildings in a block, so damage extrapolation is performed. For example, if after an earthquake, a building inspector gives red tags (i.e., damage index 3) to three buildings in a block of 20 buildings, i.e., three out of 20 buildings have damage while the rest have no damage or minor damage.

In some example embodiments, the type of each building is identified, and the fragility functions of the buildings are identified based on the type. Then, a structural engineering assumption is made that the different effects from one building to another are due to each building having a different fragility function, because other features like shaking, soil, etc., are substantially equal for the whole block.

In some example embodiments, the type of the building is unknown, but it may be known that 5% of the buildings have suffered damage. In this case, a fragility function is identified that corresponds to the damage, based on the shaking, and then that fragility function is assigned to the building.

There are four types of validation procedures to test the machine-learning algorithms: intra earthquake, inter-earthquake, geographic division, and holdout cross validation. In intra-earthquake validation, the learning and the testing are performed with data from the same earthquake. For example, the algorithm trains on 80% of the Napa earthquake data and then the algorithm is tested on the remaining 20% of the Napa earthquake data. This is the easiest type of learning.

In inter-earthquake validation, training is done on data from a plurality of past earthquakes (e.g., 20 earthquakes), and then the algorithm is used to predict the effects of another actual earthquake (e.g., the Napa earthquake). Thus, the learning is done without data from the Napa earthquake, and then the validation is performed with data from the Napa earthquake.

In geographic-division validation, the testing is performed on data from a different geographic location. In holdout cross validation, the holdout data used for testing is changed multiple times. For example, 90% of the data is used for learning and 10% of the data is reserved for testing, but the 10% is changed each time. The algorithm keeps improving until the best model is obtained. It is possible to hold out different amounts of data, such as 20% or 30%.

FIG. 12 shows a confusion matrix, according to an example embodiment, for predictions of damage for 512 testing points. It is to be appreciated that a different number of testing points may be used in other example embodiments. A confusion matrix is a table used to describe the performance of a classification model on a set of test data for which the true values are known or assumed based on engineering judgement.

Testing accuracy is measured by determining how many data points where predicted correctly. In the example embodiment of FIG. 12, table 1202 describes the correlation between actual BDI and the predicted BDI. For example, the actual BDI included 107 city blocks with a BDI 2. Of the 107 BDI 2 in the example data, a SVM model correctly classified 97 (91%), and misclassified three for BDI 0 and seven for BDI 1. Additionally, of the 195 BDI 0 in the example data, the SVM model correctly classified 172 (88%), and misclassified 23 as BDI 1. In the given example, the poorest classification is of the BDI 1, where 66 of the 203 were misclassified. Thus, for this example dataset, the model was less accurate for the lower levels of damage. However, this may be a non-critical factor when considering that the lower levels of damage generally do not contribute to major portions of the damage as the structure (e.g., of a home) remains more or less elastic. In other words, it is usually more important to be accurate when predicting higher levels of damage, and the response centers are mostly interested in these higher levels of damage. The performance of the model for each classification level may be tailored relative to the other classification levels based on the specific use case.

FIG. 13 shows a performance comparison of algorithms in accordance with some example embodiments. FIG. 13 illustrates some of the accuracy values obtained for the RF, SVM, and NN algorithms. It is noted that the results illustrated in FIG. 13 are examples, and other data sets may produce different results. The example embodiments illustrated in FIG. 13 should therefore not be interpreted to be exclusive or limiting, but rather exemplary or illustrative.

Using the final feature list, an F score for the SVM model, for the August 2014 (Napa) earthquake, was 0.879. Given the amount of randomness and outliers in damage predictions, this F score indicates fairly good results.

Figure 14:
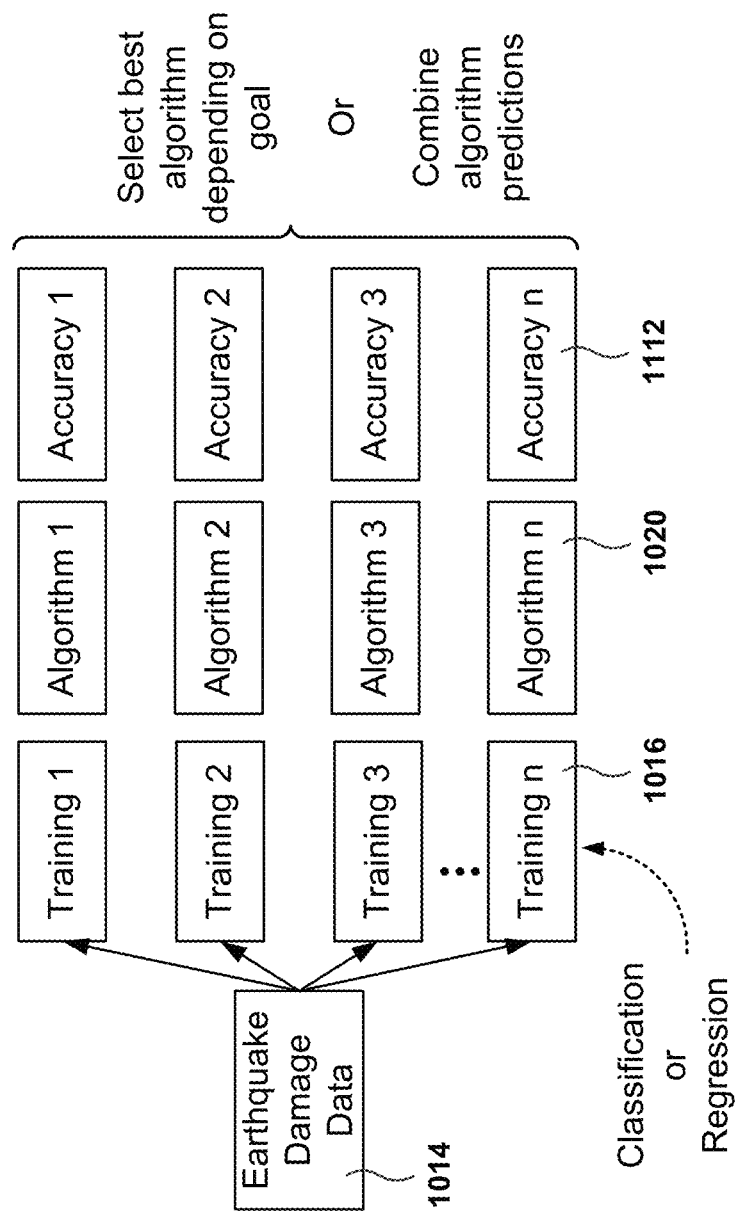
FIG. 14 illustrates example embodiments for the selection of an algorithm based on predictive accuracy.

FIG. 14 illustrates example embodiments for the selection of an algorithm based on predictive accuracy. As discussed above, multiple algorithms 1020 may be used for estimating damage, and training the algorithms 1016 may be performed in different ways to predict accuracy 1112.

Once the algorithms are tested, the best algorithm is selected, although the best algorithm may change depending on the goal and the data set. In other example embodiments, the estimates from the multiple algorithms may be combined depending on the goal.

There are two types of problems in machine learning: classification problems and regression problems. Classification problems aim at classifying items into one of several categories. For example, is this object an apple or an orange? In our case, it is important to classify between damage and no damage.

Regression algorithms aim at quantifying some item, for example by providing a value that is the real number. In some example embodiments, classification is used to determine damage or no damage, and regression is used to determine the level of the damage. For example, the algorithm could obtain a damage value of 1.3, which, depending on the goal, may or may not be rounded to the nearest whole number, e.g., 1.

During testing, ensemble methods provided a high level of accuracy, because ensemble methods utilize multiple learning algorithms, both classification and regression, to improve predictive performance. It has been observed that regression models are good at predicting between BDI's 1, 2, and 3, but classifiers are better at distinguishing between zero and nonzero.

In some example embodiments, the selection of algorithm is biased towards getting BDI labels 2 and 3 correctly, because emergency response managers are especially interested in BDI's 2 and 3, the highest levels of damage. No damage or low damage is not as important for receiving help, but BDI 2 and BDI 3 are much more important. This means that when selecting an algorithm, the algorithms that better predict BDI 2 and BDI 3 are chosen over other algorithms that may perform better for other categories, such as predicting BDI 0 and BDI 1.

One of the problems in predicting damage is selecting the best possible data for learning. Some of the perception data may include people reports such as "I have a broken chimney," or "My picture frame was moving in front of me." However, this type of data may not be helpful for BDI classification.

In order to leverage this type of damage information, other machine-learning methods are used, referred to herein as mini-machine learning models. In the mini-machine learning models, the additional damage data is utilized to predict other factors that may be used by the BDI-classification algorithms, a method referred to as cascading models. For example, it is possible to estimate how many people were awake, or how many broken chimneys were caused by an earthquake, and use this information for estimating damage.

Another problem relates to estimating damage caused by high-magnitude earthquakes. Data for California earthquakes is available, which includes earthquakes in magnitude up to 7.1 on the Richter scale. However, the question remains, is this data good enough to predict a large earthquake (e.g., a 7.5 earthquake)?

In one example embodiment, transfer-learning techniques are utilized to predict the effects of large earthquakes. Inductive transfer, or transfer learning, is a research problem in machine learning that focuses on storing knowledge gained while solving one problem and applying it to a different but related problem.

Data from other countries that have had large earthquakes is gathered, such as earthquakes in Mexico, Chile, Peru, Ecuador, Japan, and New Zealand. While the type of data available is different because it is not provided by the USGS, it is still useful as damage data. Transfer learning enables the use of this different type of data for predicting large earthquakes in California, or in other parts of the United States.

Figure 15:
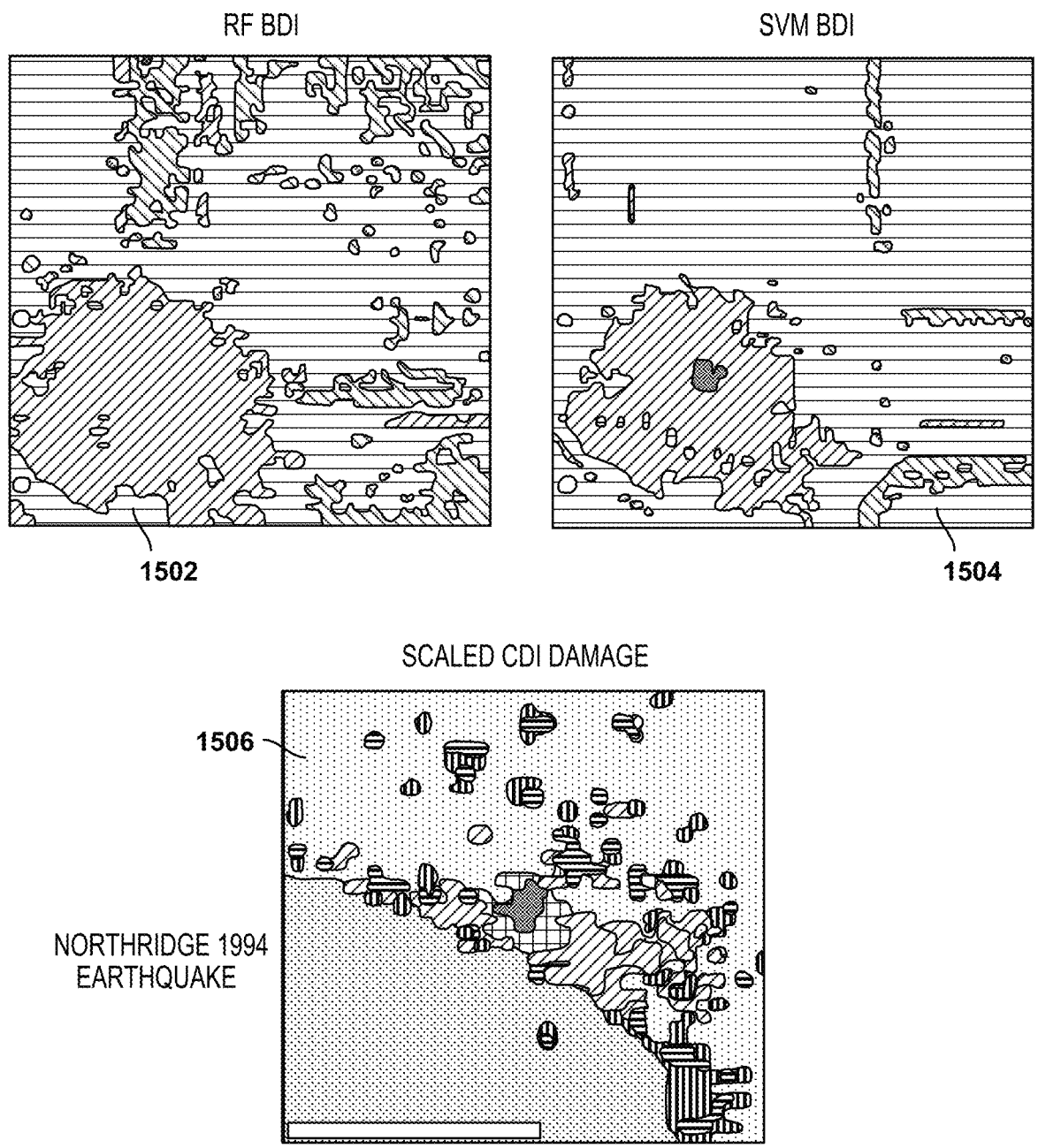
FIG. 15 shows example embodiments of screenshots of damage from the Northridge 1994 earthquake.

FIG. 15 shows example embodiments of screenshots of damage from the Northridge 1994 earthquake. Further, in an example embodiment, a visual comparison is performed to visually compare DYFI CDIs (e.g., scaled from 0-3) with predicted BDIs.

The RF BDI 1502 and SVM BDI 1504 are compared to the scaled CDI damage 1506. In this example embodiment, the SVM BDI 1504 plot predicted smoother boundaries with fewer outliers, especially in the lower damage states. Thus, in an example embodiment, the machine-learning model may supplement the knowledge gaps where DYFI data does not exist.

The example scaled CDI damage 1506 for DYFI data is not very extensive, and thus it is somewhat difficult to visually compare to the RF and SVM performance. In general, however, it appears that the trends between predicted and recorded damage are similar. It appears that the SVM BDI 1504 captures better the higher damage states near the epicenter.

Figure 16:
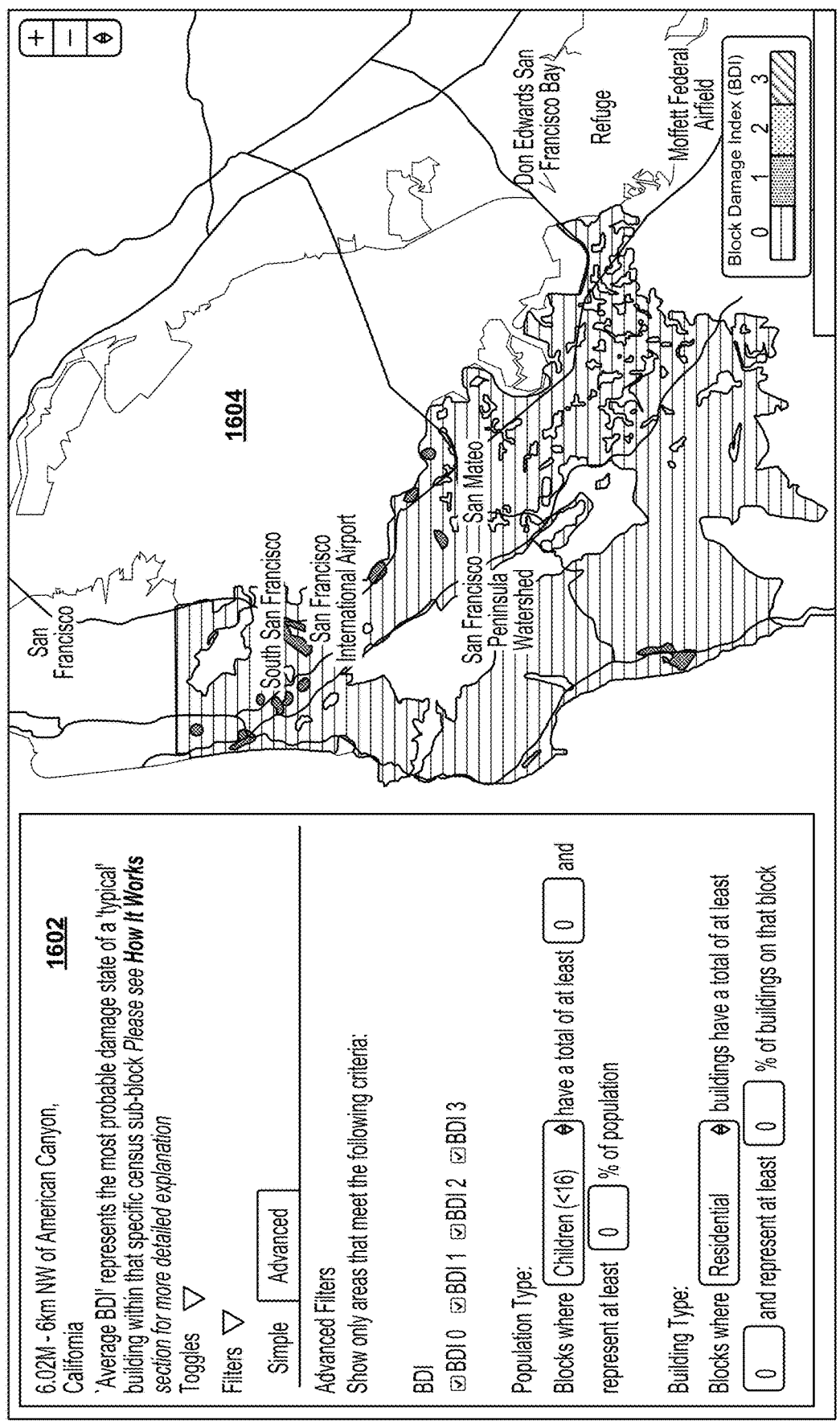
FIG. 16 is an example embodiment of a screenshot of a graphical user interface for presenting damage estimates in the region.

FIG. 16 is an example embodiment of a screenshot of a graphical user interface for presenting damage estimates in the region. FIG. 16 is part of the user interface of a tool for a community disaster-response center. In an example embodiment, a web application is provided to implement the machine-learning model described herein and make educated predictions with regard to the probable damage. In a basic embodiment of the website, a user requests a time slot when an administrator activates the background programs on the server that run on Rails, Python, JavaScript, and other programming languages. In an example embodiment, two main modes of the application are provided, namely a homeowner mode and a community-disaster response-center mode.

Typically, the USGS publishes the ShakeMap within seconds after each event. In some example embodiments, the ShakeMap data may be uploaded directly without any pre-processing, and the damage-estimation tool may automatically consider the spectral acceleration (e.g., at 0.3 s). When the ShakeMap includes multiple spectral accelerations, the tuned model(s) learn which spectral accelerations most affect structures or structural features, such as building materials, age, height, etc.

In FIG. 16, map 1604 illustrates the damage estimates for a magnitude 6.02 earthquake. Some of the areas are not analyzed (e.g., wilderness areas with few or no structures), and the remaining areas are presented with color-coded BDI damage. The operator may zoom in or out to obtain better details on the desired area.

Input area 1602 provides filter options for selecting data. For example, a filter is provided to select the BDI category. An operator may select to view BDI 3 and get a quick view of the most damaged areas. Further, other filters are available, such as filters related to demographics or building types, etc. The operator may select blocks with at least 15 children, or blocks with at least 10% of seniors. This is useful, as seniors usually require more attention than non-seniors do.

Further, the operator may select to present blocks where residential structures are at least 50% of the total. This way, the operator may select between industrial and residential zones.

Demographics are important for the response-center operator, because it might be difficult to justify sending a response team just because a computer program estimated damage. However, having the additional demographics information enables the operator to make decisions to serve areas with high estimated damage and with a high number of senior residents.

Figure 17:
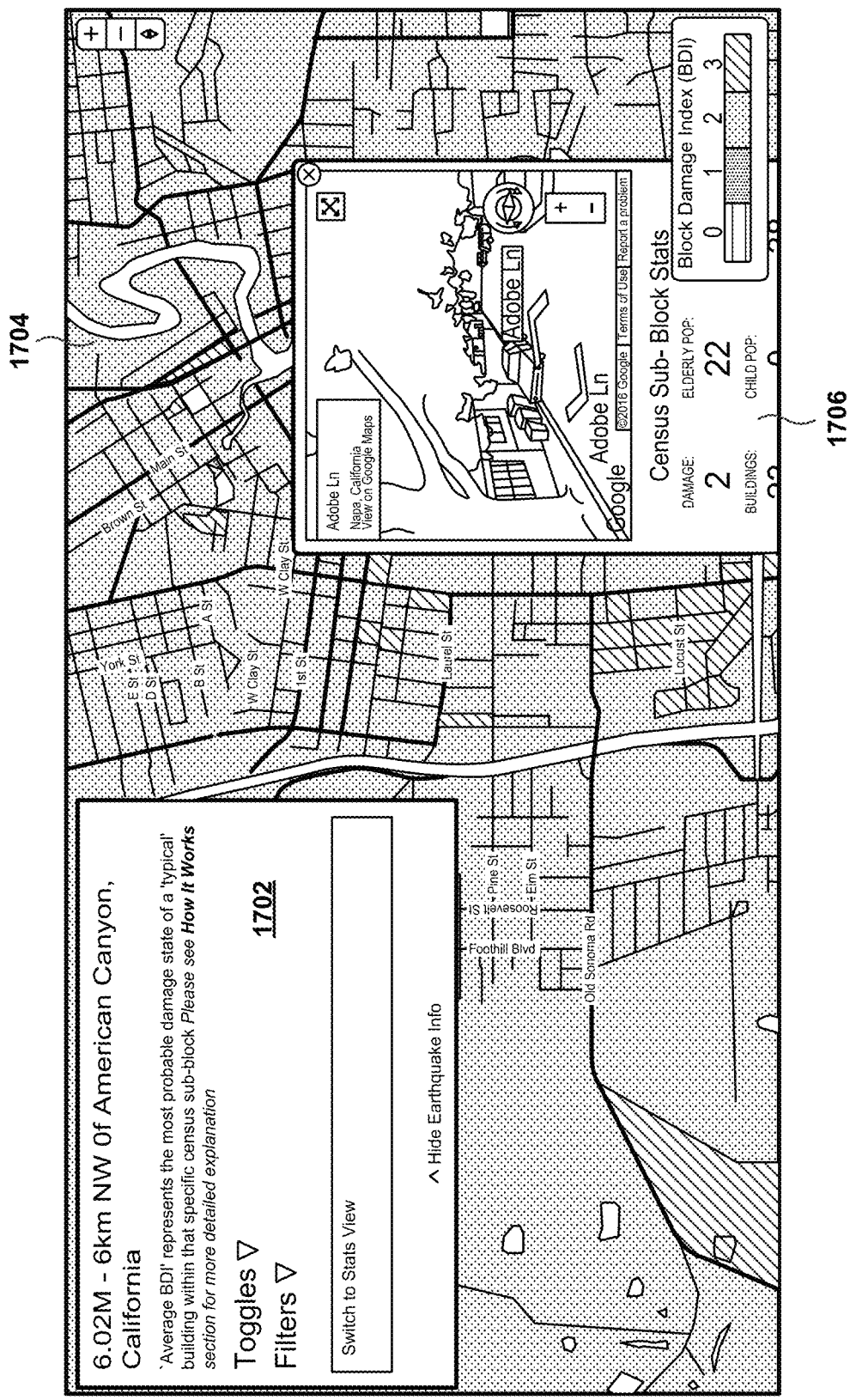
FIG. 17 is an example embodiment of a screenshot of a graphical user interface for presenting damage estimates in the region.

FIG. 17 is an example embodiment of a screenshot of a graphical user interface for presenting damage estimates in the region. Map 1704 shows a more detailed view of the earthquake area, which includes some BDI 3 areas and some BDI 2 areas. In addition, the operator may click on the map 1704 and obtain a street view 1706 of the area, which may be useful when interacting with the response teams.

It is noted that if the operator switches to a statistical view, the damage-estimation tool will present statistics for a selected block or area, such as population, average building age, population density, etc.

Another feature used for estimating damage is called after-shock treatment, which includes considering previous damage data associated with an earlier event. For example, on a certain day a 6.0 earthquake occurs, which results in damage for a particular building, such as broken windows. The next day, there is a 6.0 earthquake, but the particular building may be more susceptible to damage because of the earlier earthquake. The building then suffers additional damage, which would be more damage than if the previous earthquake had not occurred.

Since the algorithm takes into consideration the previous damage that compromised the building, the fragility function for the building is changed. In some example embodiments, the fragility function for the building is changed to increase the probability of damage.

In some example embodiments, a technique called belief propagation is used to improve the damage-estimation accuracy. Belief propagation takes into consideration additional data gathered after the event, which is fed to the algorithm to improve its accuracy. For example, after the earthquake, an emergency manager goes to the field and gathers data about actual damage to buildings, then sends the data back to the operator managing the damage estimation algorithms or uploads the data manually or automatically through an electronic application, text message, etc.

For example, a damage of 2 was estimated for a building, but the building inspector indicates that the damage is a 3. The damage-estimation program then changes the label from 2 to 3 for that building, and this additional information is propagated through neighboring buildings, thereby improving the accuracy of prediction for the neighboring buildings. This new data improves the algorithm estimation capability. For example, the algorithm's accuracy may be improved by 5% to 10%, so after a few hours, the accuracy of damage estimation may be up to 90 to 95%. Further, once a building has been repaired, the fragility function of the building returns to its original state.

Figure 18:
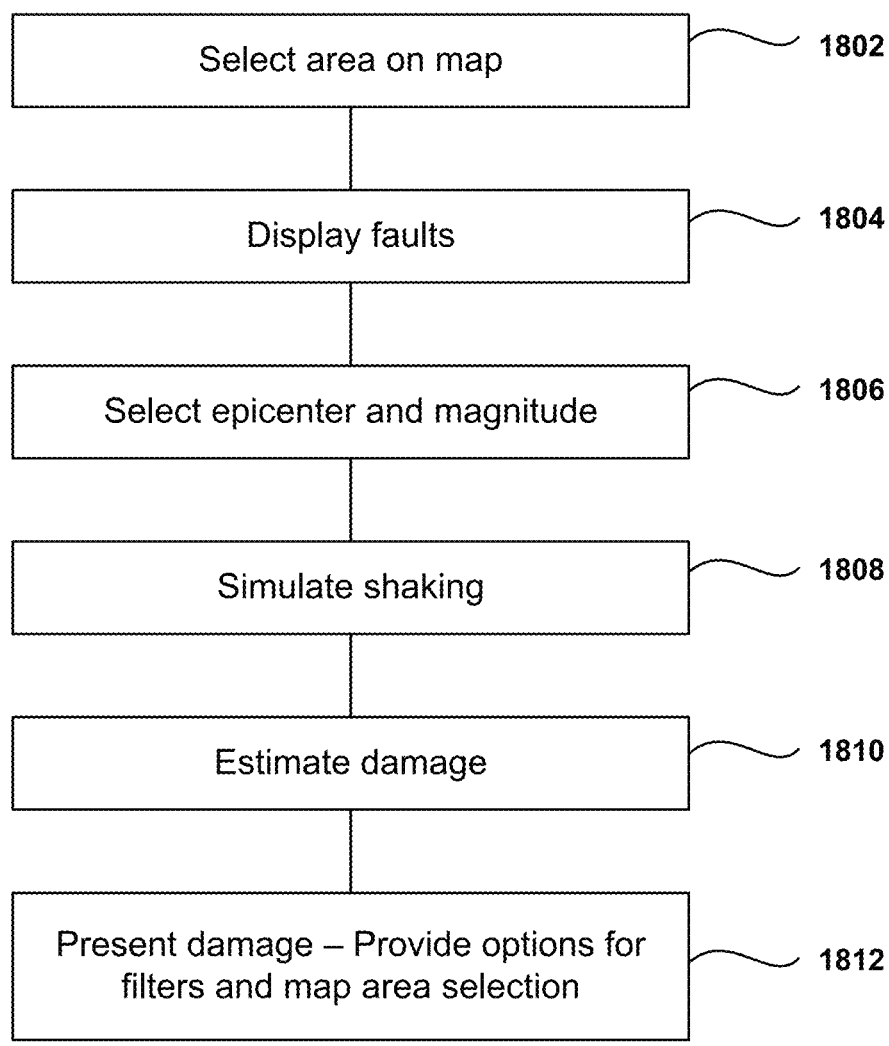
FIG. 18 is a flowchart of a method, according to some example embodiments, for performing damage simulations.

FIG. 18 is a flowchart of a method, according to some example embodiments, for performing damage simulations. While the various operations in this flowchart are presented and described sequentially, one of ordinary skill will appreciate that some or all of the operations may be executed in a different order, be combined or omitted, or be executed in parallel.

In some example embodiments, simulations are performed to estimate damage caused by a hypothetical earthquake. For example, shaking data is simulated, and the corresponding ShakeMap data is created, which is then inputted to the algorithm. Further, a model is created and an estimate of damage is presented.

Simulating damage is an important feature for response managers because it allows the managers to plan for different catastrophic events. By knowing what could happen, the manager is able to prepare plans for a response (e.g., capacity planning) or for retrofitting at-risk buildings. The damage-simulation tool is also useful for training because it enables training exercises based on the hypothetical effects of a catastrophe.

In operation 1802, according to an example embodiment, a map is presented on the damage-simulation tool, and the operator is able to select an area on the map where the epicenter will be located. From operation 1802, the method flows to operation 1804 where the earthquake faults are presented on the map. In addition, the tool presents what is the maximum magnitude estimated for each fault.

In operation 1806, input is received of a selection by the operator for the location and magnitude of the earthquake. In operation 1808, shaking data is simulated for the selected earthquake. Shaking may be predicted at one or more points in each block that is expected to feel shaking above a prescribed threshold. The shaking may be predicted using one or a combination of several, ground motion prediction equations (GMPEs). GMPEs incorporate natural features about the soil, distance to a fault, depth of rupture, etc., to estimate the intensity of ground shaking from an earthquake at a particular location of a particular magnitude.

From operation 1808, the method flows to operation 1810, where the damage is estimated, as described above. In operation 1812, the estimate or prediction of damage is presented, and the operator is provided with a similar interface as in the case of a real earthquake. The operator is able to see where the areas with high estimated damage are situated. In addition, the operator may apply filters to obtain statistical data regarding demographics, or some other type of filter.

The results may be used for areas where retrofitting laws should be enforced because there is a higher risk, or the results may assist the manager to select a location for a hospital, such as by placing the hospital close to high-risk areas. Further, the results may also be used to calculate insurance premiums and deductibles based on location-specific risk, and to conduct capacity analysis of existing resources, such as determining the maximum earthquake magnitude the city may sustain before a particular hospital is overwhelmed with patients, and determining the impact on city-wide emergency response if one hospital collapses during an earthquake (resiliency checking).

Figure 19:
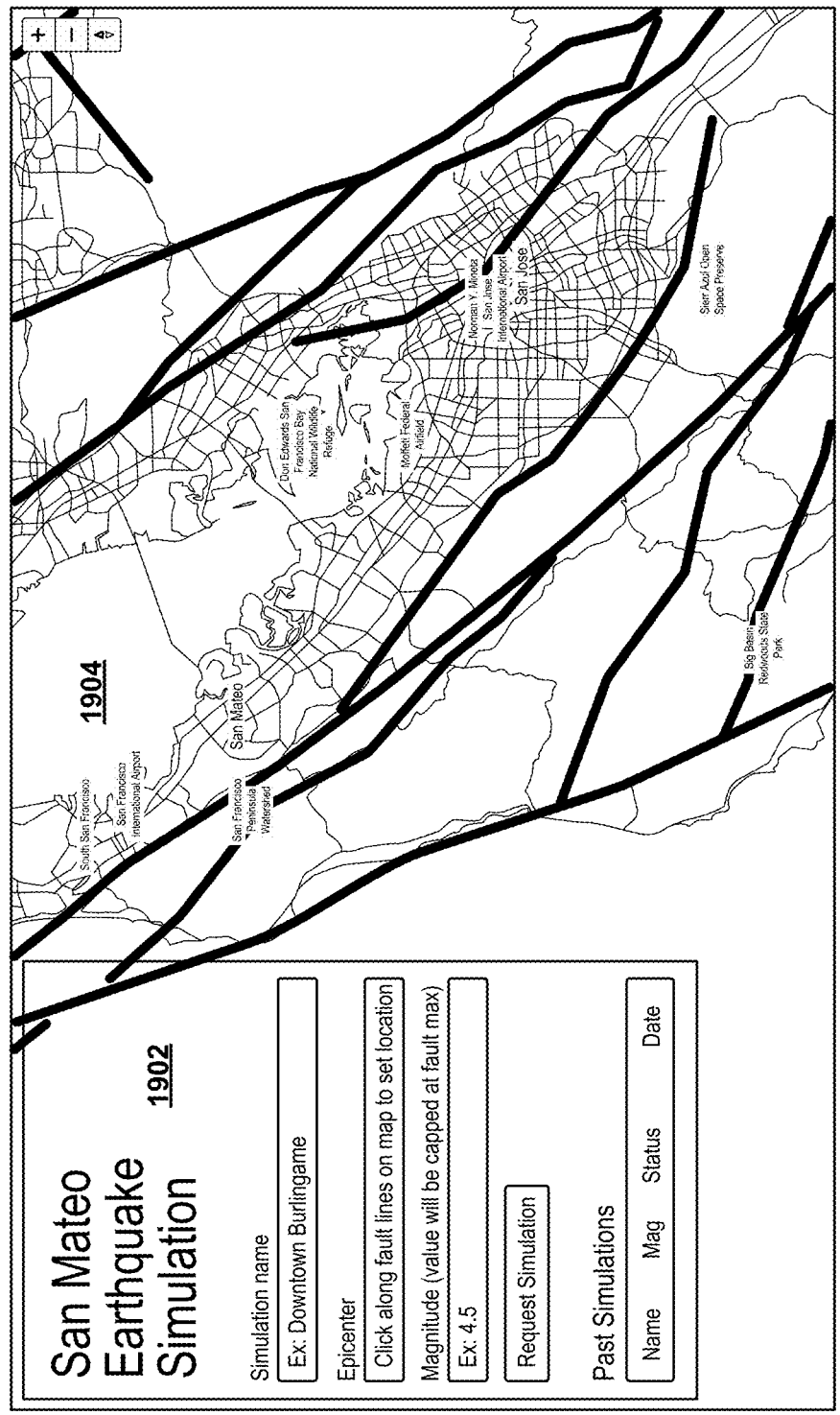
FIG. 19 is an example embodiment of a screenshot of an interface showing earthquake faults.

FIG. 19 is an example embodiment of a screenshot of an interface showing earthquake faults. After the operator selects a region in input area 1902, map 1904 shows the area and the earthquake faults in the area. If the operator runs the cursor over the fault, additional information is provided, such as the name of the fault, the maximum magnitude detected on the fault, and the maximum estimated magnitude earthquake that the fault may generate. The purpose of providing the maximum magnitude is to perform realistic simulations, instead of providing estimates for unlikely scenarios.

Figure 20:
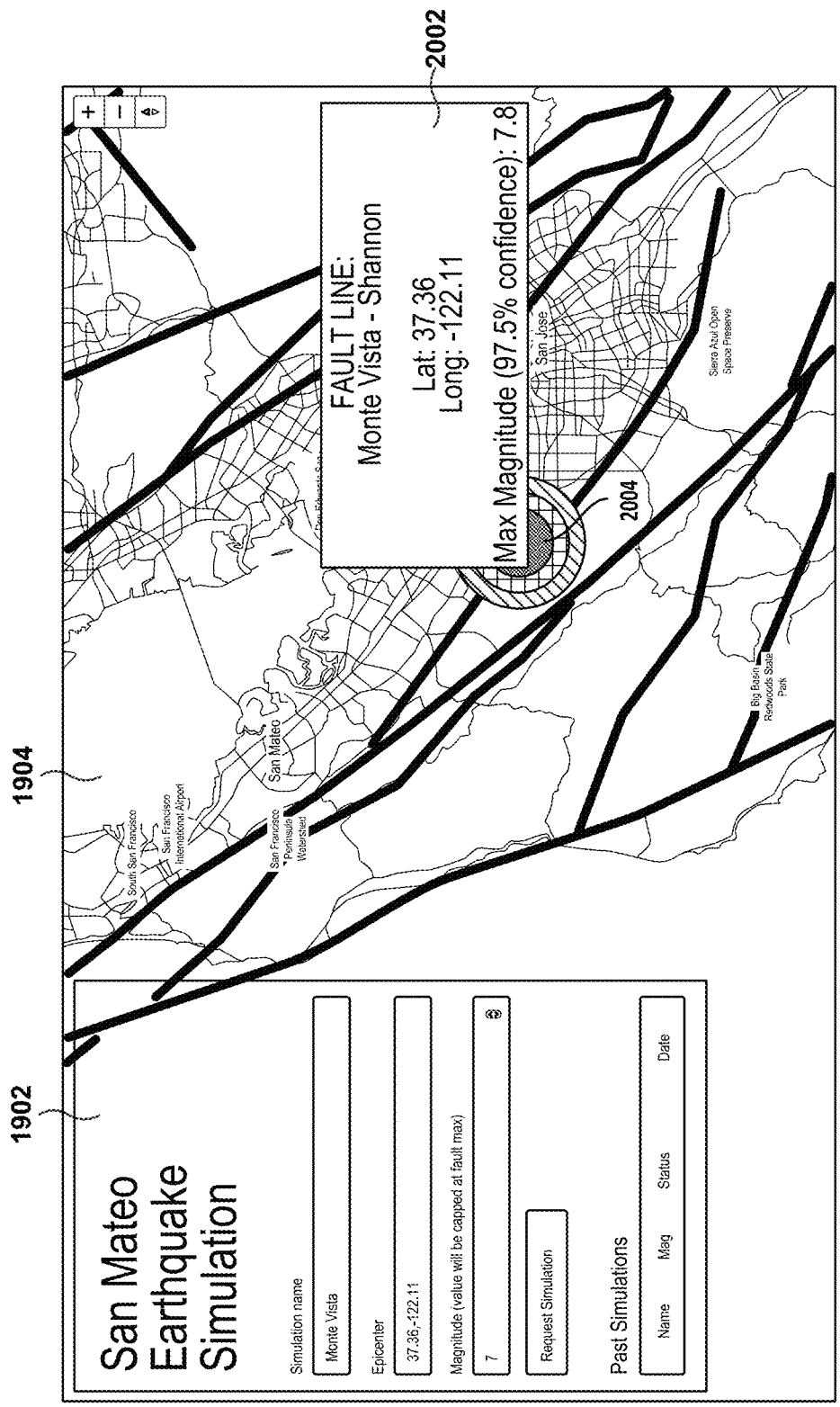
FIG. 20 is an example embodiment of a screenshot of an interface for selecting the location and magnitude of an earthquake.

FIG. 20 is an example embodiment of a screenshot of an interface for selecting the location and magnitude of an earthquake. After the operator selects the epicenter, a graphical display 2004 is presented to indicate the location of the earthquake. In addition, the latitude and longitude are presented. When the operator selects the button labeled "Request Simulation," the simulation is started. Within a few minutes, the simulation is completed, and damage predictions are presented.

Figure 21:
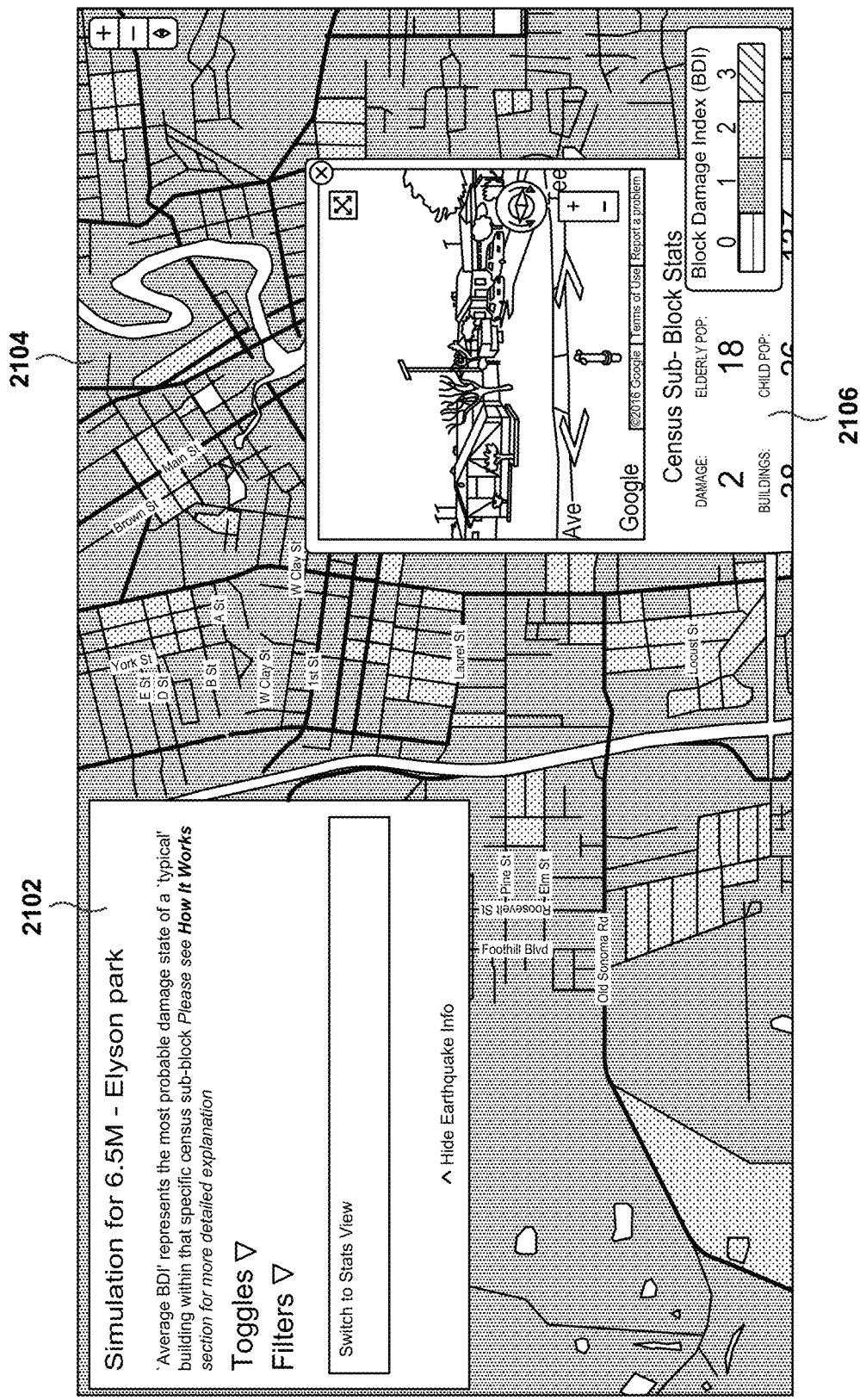
FIG. 21 is an example embodiment of a screenshot of a user interface for presenting simulation data by city block.

FIG. 21 is an example embodiment of a screenshot of a user interface for presenting simulation data by city block. The information presented for simulation is very similar to the user interface for estimating damage after a real earthquake shown in FIG. 16. The interface includes a filter area 2102, a color-coded map 2104, and an optional street view 2106.

As in the case of the real earthquake, the operator may enter filters and use the different options to obtain additional information, or focus on specific damage data, such as areas with a BDI of 3.

Figure 22:
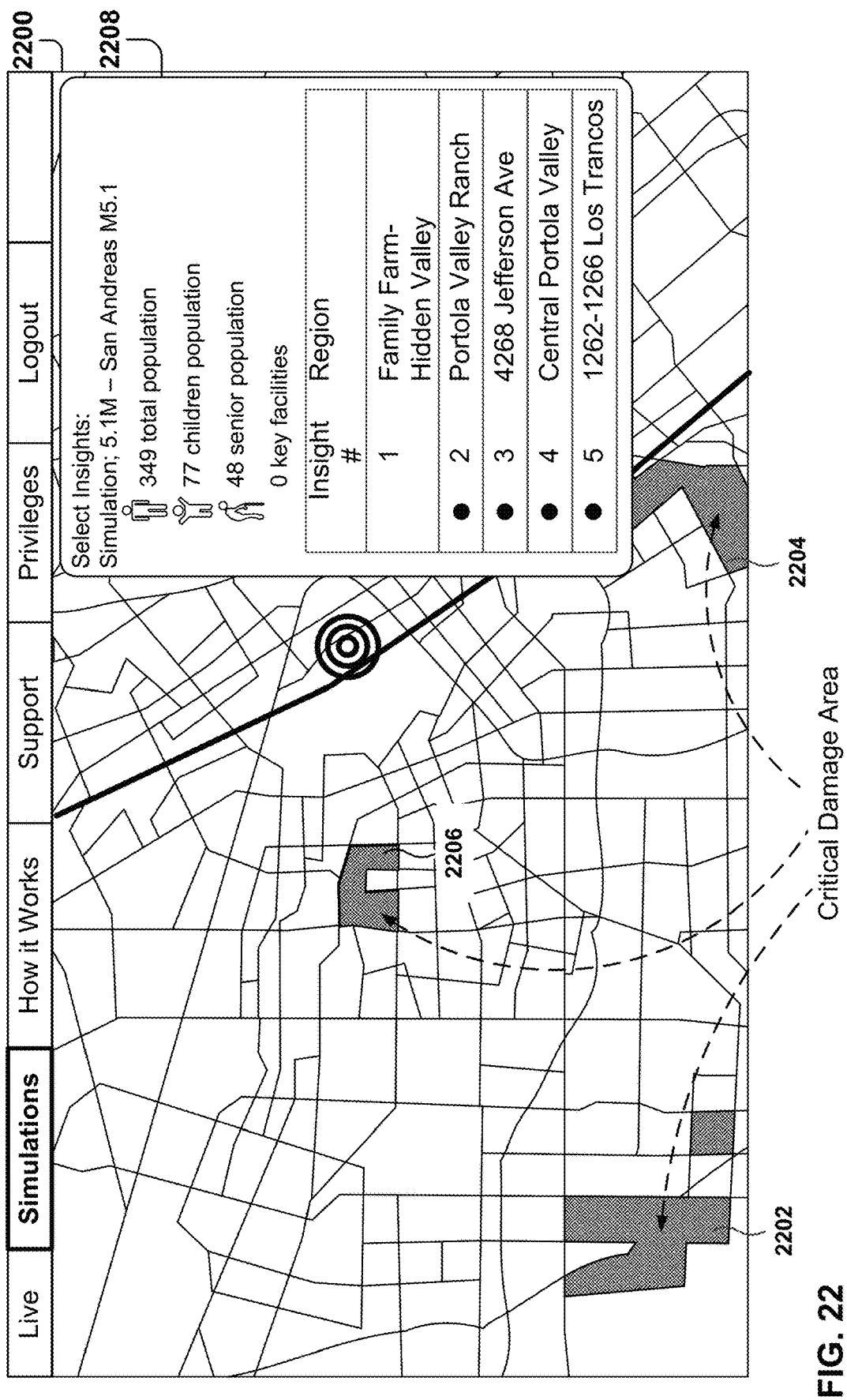
FIG. 22 is an example embodiment of a select-insights user interface presenting a damage map with critical damage areas (CDA).

FIG. 22 is an example embodiment of a select-insights user interface 2200 presenting a damage map with critical damage areas (CDA). The select-insights interface provides detailed damage information and explanations (e.g., "insights") of why certain areas may suffer high levels of damage when compared to other areas. After a simulation is performed for a hypothetical earthquake, a map is presented for the region of interest with the identified CDAs. The select-insights user interface 2200 provides information about CDAs, which are areas comprising clusters of nearby blocks that have the highest level of damage within the region. The select-insights user interface 2200 provides additional details of damage causation for the CDAs, but the select-insights user interface 2200 may also be used to obtain additional damage explanations for a given block or for a particular building.

Several parameters may be configured to determine how to identify CDAs, as discussed in more detail below with reference to FIG. 25, such as the maximum size of the CDA, maximum distance between blocks, etc. It is noted that not all the blocks in the CDA must be within a continuous area, and some blocks may be physically separated from other blocks in the CDA, such as is in the case of CDA 2202.

After the CDAs are identified, the CDAs are presented on the select-insights user interface 2200 map with a prominent characteristic, such as a specific color shading, a thick line surrounding the CDA, a text title over the CDA, etc. In the exemplary embodiment of FIG. 22, three CDAs are identified: 2202, 2204, and 2206. In addition, an information area 2208 provides information about the simulation (e.g., the simulation is for a 5.1 earthquake on the San Andreas Fault, the number of people affected) and a description of the CDAs (e.g., five insight regions are identified: Family Farm-Hidden Valley, Portola Valley Ranch, etc.).

In some example embodiments, the CDA area on the map provides an option to the user to obtain more information, and when the user clicks on the CDA (referred to as Insights in the user interface), a separate page is presented with more details about the CDA, such as the interfaces presented in FIGS. 23A-23G.

Figure 23A:
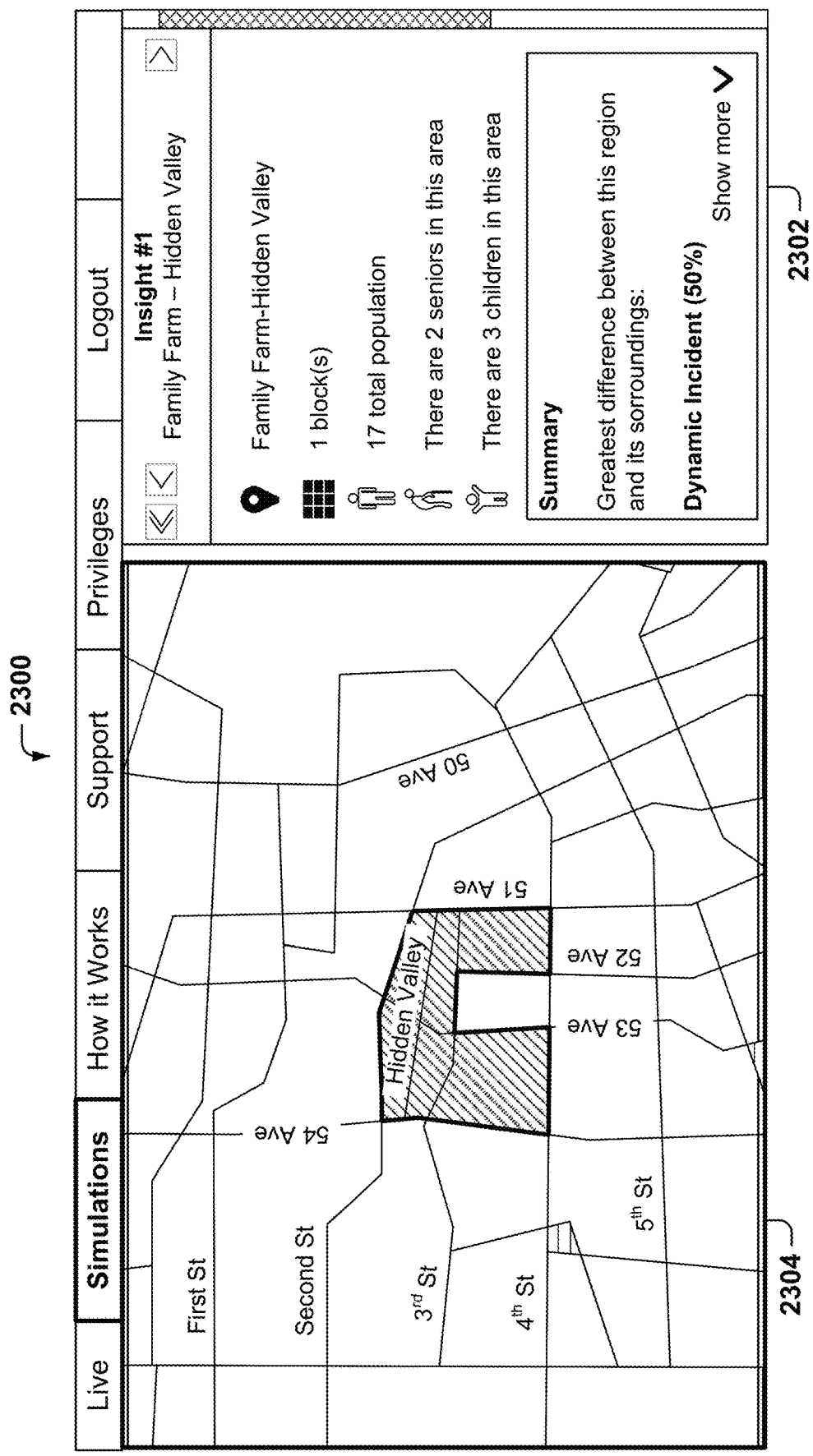
FIGS. 23A-23G illustrate details of the select-insights user interface for presenting details about a CDA, according to some example embodiments.

FIGS. 23A-23G illustrate details of the select-insights user interface for presenting details about a CDA, according to some example embodiments. In FIG. 23A, the select-insights detail user interface 2300 includes a detailed map 2304 of the CDA and surrounding area. The map 2304 shows the location of the blocks within the CDA, names of the surrounding streets, BDIs, etc. In this example embodiment, the CDA has a BDI of three, but in other embodiments, the CDA may have a BDI of two if there are no blocks, or few blocks, with a BDI of three.

After the CDA is identified, the simulator analyzes the features utilized by the machine learning program (e.g., shaking, built environment, and natural environment features) to suggest possible reasons why the CDA has a higher damage level than nearby areas.

Each of the features that may identify the damage differences are analyzed by comparing the value of the feature for buildings within the CDA and for buildings outside the CDA in nearby areas (e.g., within a quarter-mile of the CDA, although other distances may be used for selecting buildings or blocks to be part of the analysis). More details are provided below with reference to FIG. 26 regarding the method for analyzing the machine-learning features.

Based on the analysis of feature values, the simulator suggests all possible reasons why the BDI in the CDA is higher than in surrounding areas as well as the level of significance associated with each reason. For example, if the median value of the year in which a building was built in the CDA is 1945 and outside the CDA is 1965, this feature may be identified as a possible reason for the difference in damage levels because the difference is statistically significant.

The user interface 2300 further includes an information area 2302 with information about the CDA (e.g., Insight #1, Family Farm-Hidden Valley CDA) and detected features that may explain the higher damage level. In the example embodiment of FIG. 23A, the information area 2302 includes a description of the location (Family Farm-Hidden Valley), the number of blocks in the CDA (e.g., one block), the total population of the block (17 people), the number of seniors, and the number of children in the CDA. In addition, the beginning of the summary section is shown, which is viewable when the user scrolls down, as illustrated below with reference to FIG. 23B.

Figures 23B, 23C, 23D:
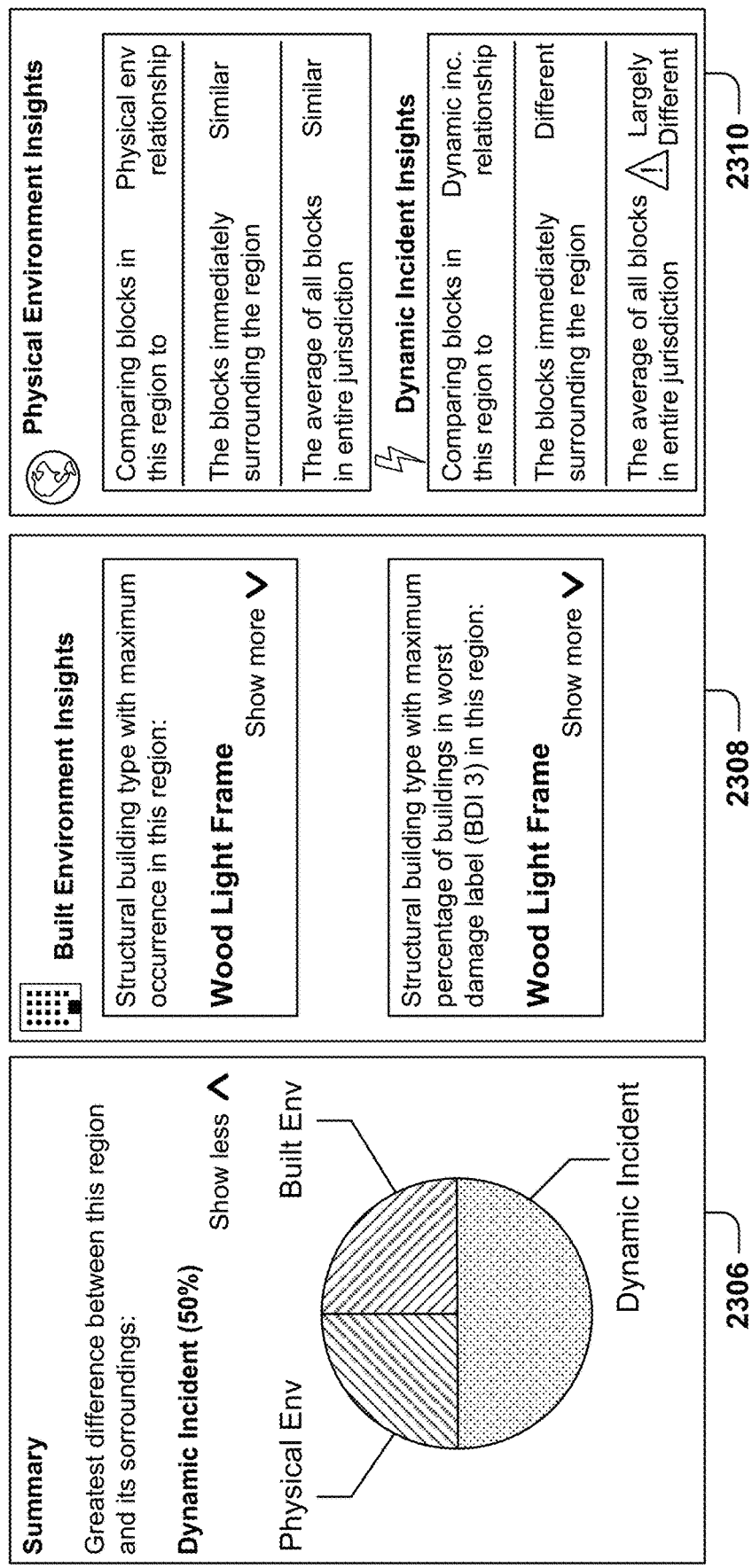

Information area 2306 in FIG. 23B shows a summary comparing the current CDA to the surrounding areas. In this example embodiment, a pie chart is presented where the differences with the surrounding areas are divided into physical environment differences, built environment differences, and dynamic incident differences. The dynamic incident refers to the level of shaking on the area. In this case, the damage differences are attributed to dynamic incident (about 50%), physical environment (about 25%), and build environment (about 25%).

As the user scrolls down, information area 2308 of FIG. 23C shows details on the built environment insights. In this example embodiment, the information provided indicates that the structural building type with the maximum occurrence in the region is wood light frame. In addition, the structural building with the maximum percentage of buildings in BDI 3 within the CDA is also wood light frame.

As the user scrolls down, information area 2310 in FIG. 23D provides detail about the physical environment and the dynamic incident. In this exemplary embodiment, the physical environment details compares block in this region to the blocks immediately surrounding the region with the result that the physical environment is similar. In addition, the comparison of the average of all blocks in the jurisdiction compared to the CDA is also similar.

The dynamic incident insights compares blocks in the region to the blocks immediately surrounding the region and identifies that the dynamic incident was different. In addition, the comparison of all the blocks in the entire jurisdiction for the blocks in the CDA with reference to the dynamic incident is indicated as largely different, and a warning icon is placed here to call attention to the user of this significant difference. In this example embodiment, the comparisons are identified within a category from a predefined set that includes values of similar, very similar, different, and largely different, but other embodiments may utilize other categories such as a numerical value indicating the difference level the value between 0 and 100.

Figure 23G:
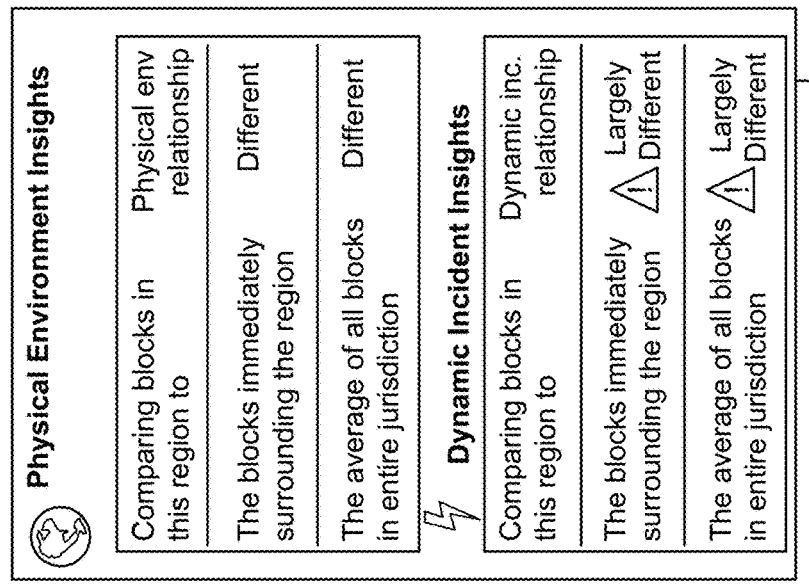
Figure 23F:
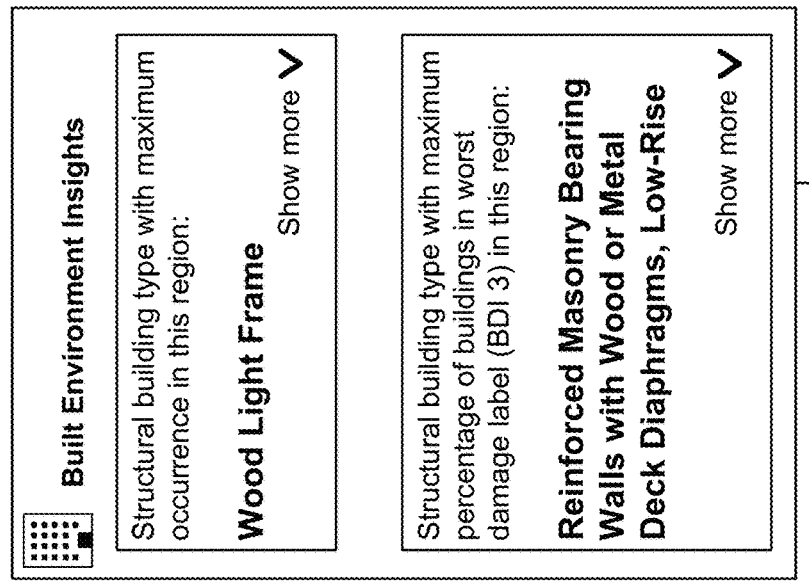
Figure 23E:
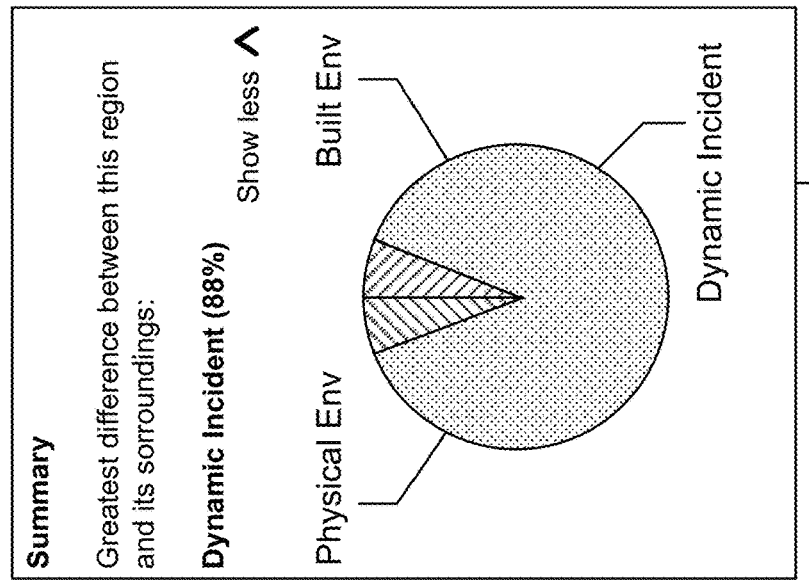

FIGS. 23E-23G show details for insight #2 in the area of Portola Valley Ranch. In incident #2, the summary 2312 of FIG. 23E shows that the greatest difference with surrounding areas is for the dynamic incident, with about 88% attribution of the differences in damage levels, while the physical environment and build environment contribute with about 6% of the differences.

Information area 2314 in FIG. 23F shows that the building type with maximum occurrence in the region is wood light frame and that the building type with the maximum percentage of buildings in BDI 3 area is for reinforced masonry bearing walls with wood or metal deck diaphragms, low-rise buildings.

Information area 2316 in FIG. 23G shows the physical environment insights and the comparison of the blocks to the surrounding region shows different types of physical environment as well as differences with reference to the average of all the blocks in the entire jurisdiction. In the dynamic incident insights area, the comparison illustrates that the blocks in the immediate surrounding region, and also the average of all blocks in the entire jurisdiction, are largely different, which accounts for a big percentage of the damage differences in the CDA.

In some cases, the soil type is identified as a key difference. The USGS defines several types of soils, including type A (lose rock), type B (rock), type C (very dense soil and soft rock), type D (stiff soil—e.g., mud), and type E (soft soil—e.g., artificial fill). In one example, the soil type is identified as a feature of interest because 80% of the buildings in the CDA are built over type-D soil, while only 10% of the buildings in the surrounding area are built over type-D soil.

In other example, the age of buildings is identified as a feature of interest because 90% of the buildings in the CDA were built before 1970 while only 45% of the buildings in the surrounding area were built before that date. In addition, the median age of the buildings in the CDA is 55 years old, with only 5% of them having gone through retrofitting. In the surrounding area, the median age of the buildings is 33 years old. Therefore, the age of the buildings may be another factor that justifies the difference in damage level between the CDA and the areas around the CDA.

In some example embodiments, the information area includes an option (not shown) selectable by the user for obtaining details of feature values at the building level. For example, if the user selects this option, a list of buildings, for the CDA and the surrounding area, is provided with the type of soil under the building and the age of the building.

In addition, the simulation program provides an option (not shown) to the user asking for validation of the identified results and additional input. The user may confirm that the estimates, and the value of the features, are reasonable for the user. In addition, the user may enter additional input, such as retrofit data or updates to parameter values. This additional information may be used for future simulations to refine the results.

With each simulation, the user may discover new details or revelations about the buildings in the area that may be used for disaster planning. In addition, government agencies may make plans of action for possible earthquakes, so if the earthquake ever happens, the agency can quickly access the plans previously prepared. Additionally, community leaders may decide to take action to mitigate possible damage on CDA areas, such as by upgrading access roads, providing retrofit help to building owners, upgrading electrical or water lines, etc.

Figure 24:
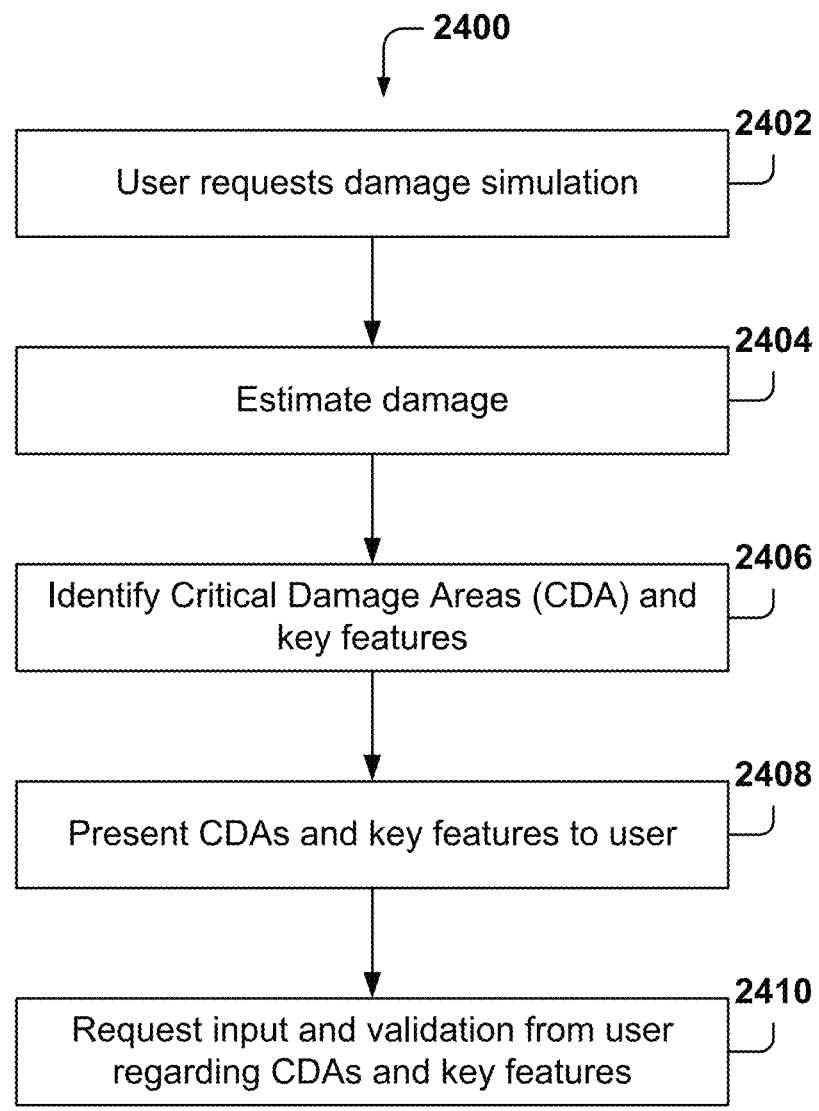
FIG. 24 is a flowchart of a method for determining which features may contribute to high damage in critical damage areas, according to some example embodiment.

FIG. 24 is a flowchart of a method 2400 for determining which features may contribute to high damage in critical damage areas, according to some example embodiments. While the various operations in this flowchart are presented and described sequentially, one of ordinary skill will appreciate that some or all of the operations may be executed in a different order, be combined or omitted, or be executed in parallel.

At operation 2402, a user requests a damage simulation for a certain geographical region based on a hypothetical earthquake, such as by defining the shaking intensity and the location of the epicenter within a fault line.

From operation 2402, the method 2400 flows to operation 2404 where the damage estimate is calculated. At operation 2406, an analysis is made to identify the critical damage areas, as described in more detail below with reference to FIG. 25.

From operation 2406, the method 2400 flows to operation 2408 where the CDAs are presented, together with the key identified features, to the user. See for example the user interfaces of FIGS. 22 and 23. At operation 2410, the program requests input and motivation from the user regarding the providing of values for the CDAs and the key identified features.

It is noted that method 2400 may be used to find key features for CDAs, but the same principles may be applied for comparing buildings in areas of different sizes. For example, the same analysis may be performed to find reasons why buildings within a block suffer higher levels of damage than other buildings within the same block, or to compare damage levels between two blocks, etc.

Figure 25:
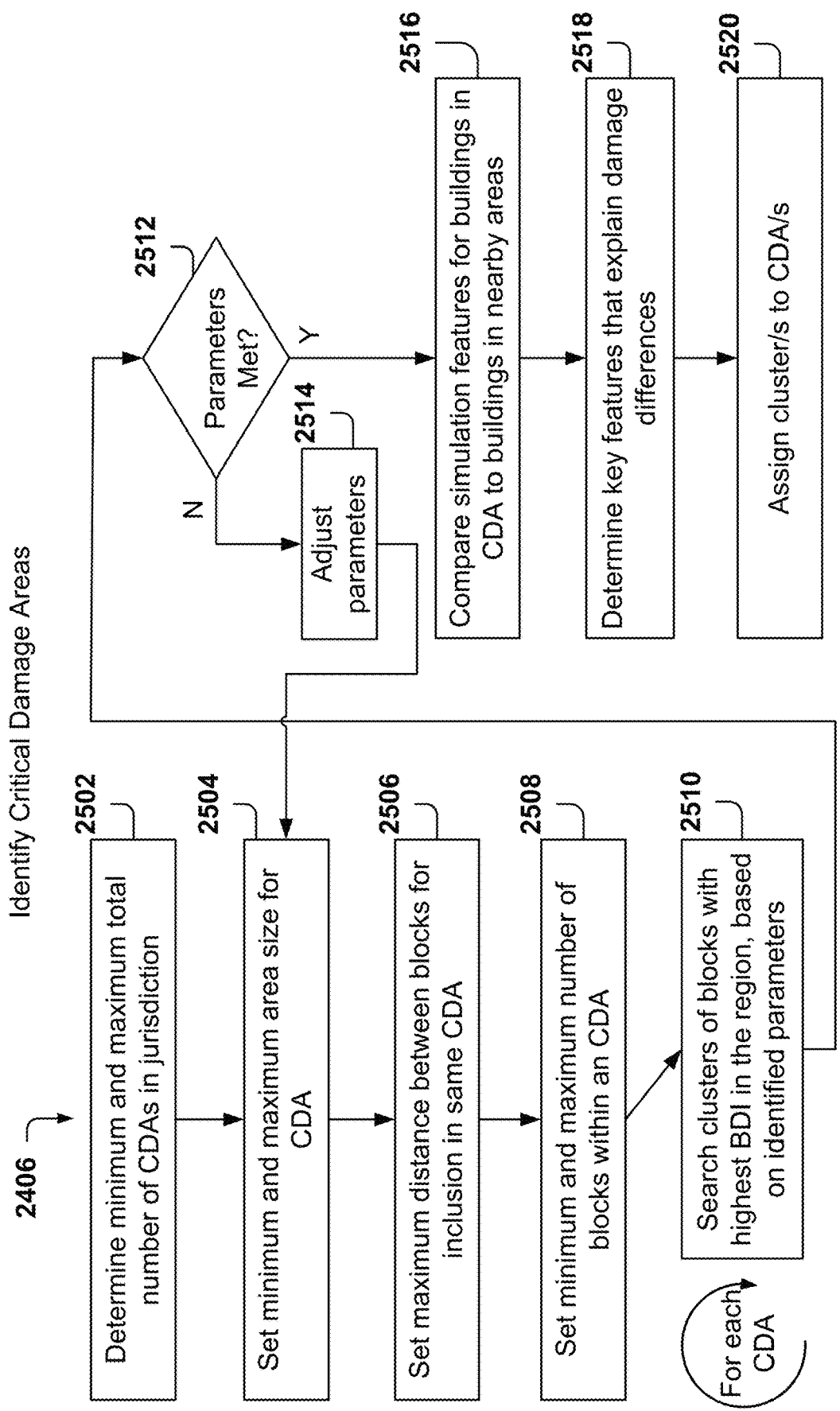
FIG. 25 is a flowchart of a method for identifying the critical damage areas, according to some example embodiments.

FIG. 25 is a flowchart of a method for identifying the critical damage areas, according to some example embodiments. While the various operations in this flowchart are presented and described sequentially, one of ordinary skill will appreciate that some or all of the operations may be executed in a different order, be combined or omitted, or be executed in parallel.

At operation 2502, the minimum number of CDAs and the maximum number of CDAs within an area (e.g., a jurisdiction) are identified. Limiting the number of CDAs assists the user in identifying problematic areas because if too many CDAs are identified, the significance of identifying CDAs may be lost.

At operation 2504, the minimum area size and the maximum area size for the CDA are set. For example, a requirement for the minimum and maximum number of square miles for the CDA are determined. These parameters are important because if the maximum area is too big, then the whole map may become a CDA. On the other hand, if the CDA is too small, the CDA may include just a handful of buildings, which might not be particularly meaningful within the context of the whole jurisdiction.

At operation 2506, the maximum distance between blocks to be considered for inclusion in the CDA is set. The CDA includes geographically clustered blocks, and the CDA may include blocks that do not border each other, while keeping the distance between the blocks within a maximum degree. By determining the maximum distance, there is a better chance that the features that may explain the damage differences have the same, or similar, values for the blocks and buildings within the CDA. Further, establishing a maximum distance makes the CDA appear as a cohesive unit.

At operation 2508, the minimum and maximum number of blocks within the CDA are set. For example, a CDA may include between 5 and 20 blocks, but other ranges are possible and the number may be fine-tuned by the system or by the user.

At operation 2510, the system searches for clusters of blocks with the highest BDI in the region, taking into consideration one or more of the parameters identified in operations 2502, 2504, 2506, and 2508. In other example embodiments, the CDA may in take into consideration more than one BDI levels, for example, BDIs 2 and 3 if the jurisdiction includes a large portion of blocks with BDI 0 and 1.

From operation 2510, the method flows to operation 2512, where a check is made to determine if the parameters for finding CDAs have been met (e.g., enough clusters have been identified meeting the parameters specified above, or if too many clusters have been found). If the parameters have not been met, the method flows to operation 2514 where the parameters are adjusted before a new search cycle is performed. For example, if too many CDAs have been identified (e.g., above the determined maximum total number of CDAs in the region), the system may redefine the maximum number of CDAs or other parameters for finding CDAs (e.g., maximum distance between blocks) in order to reduce the number of CDAs. If the parameters have been met, the method flows to operation 2516, where, for each CDA, a comparison is made between the values of the simulation features for the buildings in the CDA and the values for the nearby buildings.

At operation 2518, a determination is made regarding which are the key features that may explain the differences in damage levels between the CDA and the nearby areas. The determination is made using information obtained at operation 2516, as well as parameters from the machine learning models used to make the BDI prediction which indicate the respective contribution (or importance) of each feature to calculating the overall damage index of that building and BDI of that block. From operation 2518, the method flows to operation 2520, where the identified clusters are assigned to respective CDAs.

It is noted that the embodiments illustrated in FIG. 25 are examples and do not describe every possible embodiment. Other embodiments may utilize different parameters, fewer parameters, any combination of parameters, etc. The embodiments illustrated in FIG. 25 should therefore not be interpreted to be exclusive or limiting, but rather illustrative.

Figure 26:
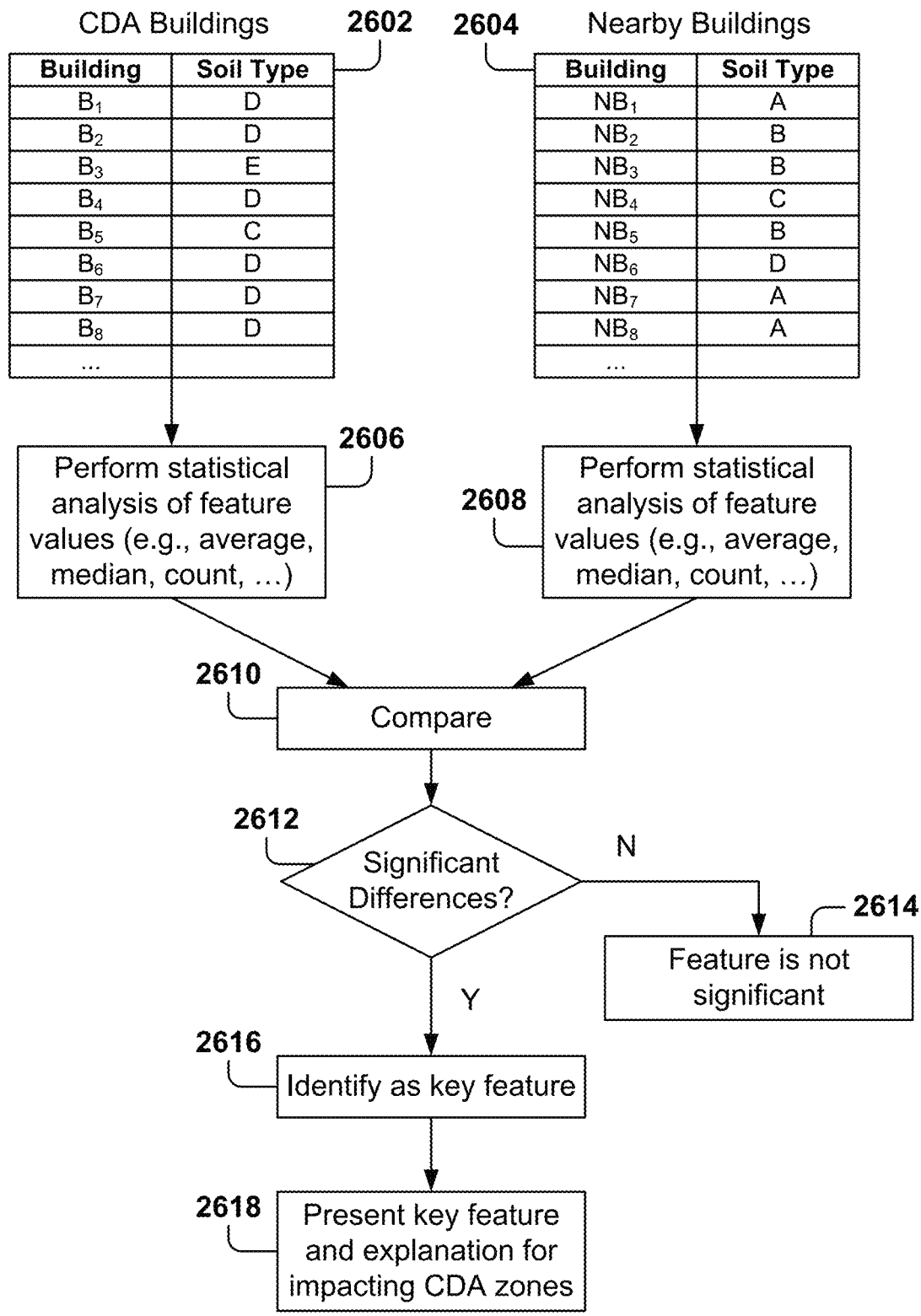
FIG. 26 illustrates the comparison of values associated with a certain feature for buildings in the CDA and nearby buildings outside the CDA, according to some example embodiments.

FIG. 26 illustrates the comparison of values associated with a certain feature for buildings in the CDA and nearby buildings outside the CDA, according to some example embodiments. In this example, the soil type is being evaluated as a possible key feature for explaining differences in the damage levels.

The simulation program identifies the soil type for each building. Table 2602 includes the soil type for each of the buildings in the CDA, and table 2604 includes the soil type for each of the nearby buildings outside the CDA. At operation 2606, the simulation tool performs a statistical analysis of the feature values. The statistical analysis may depend on the type of feature being analyzed, and one or several different statistical measurements may be considered. For example, the statistical analysis may include calculating the average of a numerical value, or the median value of the numerical value for within a sorted list of values (e.g., as in the case of the soil types that range from A-E), or the mode for the different values, or counting the values in each of a category bucket (e.g., how many buildings have soil type D or E), or the percentage of values within a certain range or category, a geometric mean, an addition, etc. The statistical value is used to identify significant differences between the CDA buildings and the nearby buildings, and the statistical value, and the criteria for marking a key feature, may change per feature.

For example, for the soil type analysis, a count is performed to see how many buildings have soil type D or E, and how many buildings have soil type A, or B, or C. The count is used to identify the percentage distribution for each soil type. In this exemplary embodiment, the CDA buildings appear to have larger distribution of type D soil, which means that these buildings may shake more in case of an earthquake because of the weaker soil type. On the other hand, the nearby buildings appear to be associated with mostly A, B, or C soil types, so the expected damage will be less than for CDA buildings.

At operation 2608, the same statistical analysis is performed for nearby buildings, and it operation 2610, a comparison is made between the statistical values for the CDA buildings and the statistical values for the nearby buildings.

From operation 2610, the method flows to operation 2612 where a check is made to determine if the comparison identified significant differences in the statistical measures between the CDA buildings and the nearby buildings. If no significant differences are found, the method flows to operation 2614 where the feature is identified as not a key feature or a significant feature. However, if significant differences are found, the method flows to operation 2616.

The criteria to identify a key difference may be fined tuned by the system based on the feature type. For example, for some features, the feature is considered significantly different if the difference in value is greater than 10%, although other embodiments may use different criteria percentages. In other examples, the criteria may be set such that the percentages of values within a category exceeds a particular threshold. For example, in the case of soil type, the feature is considered a key feature if the percentages of buildings with soil type D or E is 20% higher than in nearby buildings.

At operation 2616, the features identified as having statistically significant differences are analyzed to determine which are identified as key features. It is noted that some features may have a higher level of significance than other features, and the thresholds for explaining damage may be different. For example, if one feature considered is the color of a home, the color may not be considered a significant feature even though many of the buildings in the CDA are brown while buildings outside the CDA are mostly white. On the other hand, soil type is generally considered a key feature for explaining damage, so even small deviations in the statistical distribution of soil types among the buildings in the CDA versus nearby buildings may be considered as important.

In operation 2618, the key features are presented to the user along with an explanation on how the feature impacts the damage in the CDAs. The explanation is based on the statistical feature value comparisons determined in operation 2612, and justified by the analysis in operation 2616.

It is noted that the embodiments illustrated in FIG. 26 are examples and do not describe every possible embodiment. Other embodiments may utilize different features, different statistical measurements, etc. The embodiments illustrated in FIG. 26 should therefore not be interpreted to be exclusive or limiting, but rather illustrative.

Figure 27:
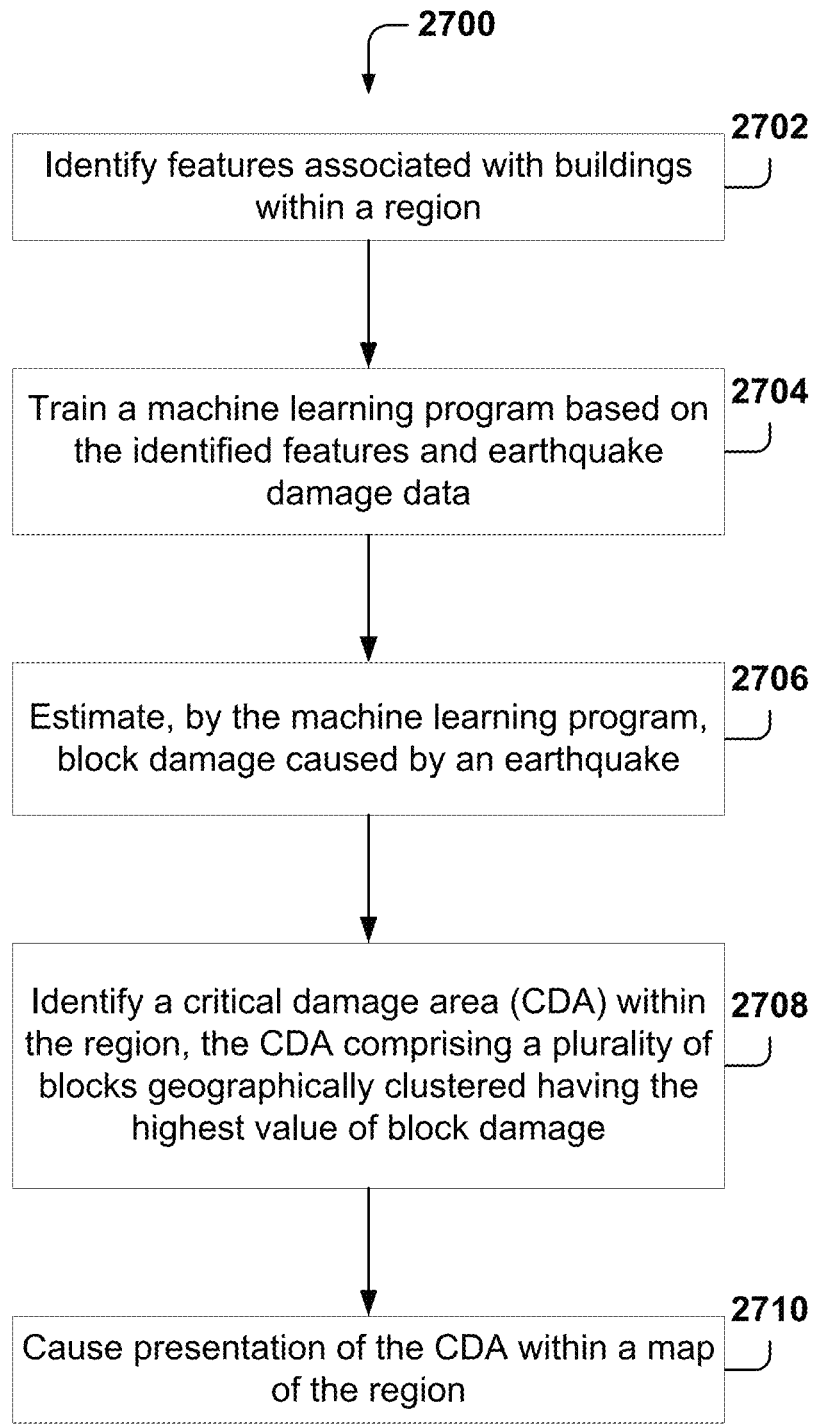
FIG. 27 is a flowchart of a method, according to some example embodiments, for determining cluster areas within a region having higher estimates of damage caused by an earthquake as compared to damage in nearby areas.

FIG. 27 is a flowchart of a method 2700, according to some example embodiments, for determining cluster areas within a region having higher estimates of damage caused by an earthquake as compared to damage in nearby areas. While the various operations in this flowchart are presented and described sequentially, one of ordinary skill will appreciate that some or all of the operations may be executed in a different order, be combined or omitted, or be executed in parallel.

At operation 2702, features associated with buildings within a region are identified. From operation 2702, the method 2700 flows to operation 2704 for training, by one or more processors, a machine learning program based on the identified features and earthquake damage data.

From operation 2704, the method 2700 flows to operation 2706 where the one or more processors estimate, using the machine learning program, block damage caused by an earthquake.

From operation 2706, the method 2700 flows to operation 2708 where the one or more processors identify a critical damage area (CDA) within the region. The CDA comprises a plurality of blocks geographically clustered having the highest value of block damage. Further, at operation 2710, the one or more processors cause presentation of the CDA within a map of the region.

The method 2700 further includes determining parameters for identifying the CDA, the parameters including one or more of minimum size of the CDA, maximum size of the CDA, maximum number of CDAs within the region, and maximum distance between blocks in the CDA. In one example, identifying the CDA further includes: identifying blocks in the region with the highest value of block damage, selecting a plurality of blocks that meet the parameters for identifying the CDA, and creating the CDA with the selected plurality of blocks.

In another example, the method 2700 further includes analyzing values of the features for buildings in the CDA and buildings in an area next to the CDA, determining which features show a significant difference between the values of the features for the buildings in the CDA and the buildings in the area next to the CDA, and presenting the determined features in a user interface as factors that explain the block damage for blocks in the CDA. In some example embodiments, determining which features show a significant difference includes analyzing each of a plurality of features used by the machine learning program, where analyzing each feature further includes: calculating one or more statistical values for the values of the features in the buildings in the CDA, calculating one or more of the statistical values for the value of the features in buildings in the area next to the CDA, and identifying the features as showing the significant difference based on a comparison between the calculated statistical values for buildings in the CDA and the buildings in the area next to the CDA. In some example embodiments, the method 2700 further includes sorting the features showing a significant difference based on an estimation of a contribution of each feature for explaining damage differences.

In one example, presentation of the CDA further includes presenting an area occupied by the CDA in the map of the region with a color different from any color in the rest of the map.

In yet another example, presentation of the CDA further includes presenting an area occupied by the CDA in the map of the region surrounded by a line type different from other lines in the rest of the map.

In another example, the features are classified as built environment features, natural environment features, and shaking features.

In yet another example, the features include one or more of type of structure, amount of shaking, type of soil, structural parameters for a building, population density, damage state, elevation, and spectral displacement.

Figure 28:
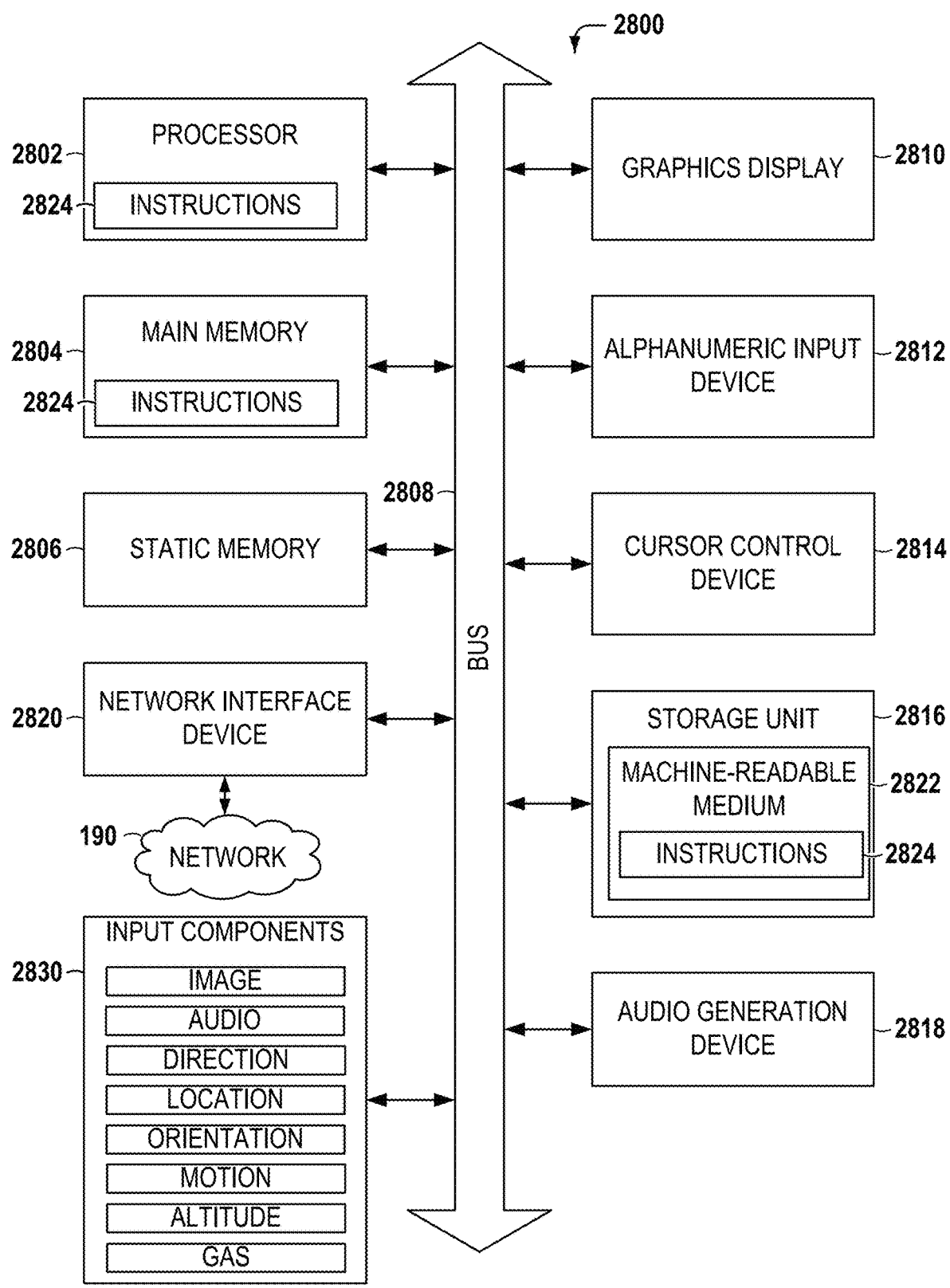
FIG. 28 is a block diagram illustrating components of a machine, according to some example embodiments, able to read instructions from a machine-readable medium and perform any one or more of the methodologies discussed herein.

FIG. 28 is a block diagram illustrating components of a machine 2800, according to some example embodiments, able to read instructions 2824 from a machine-readable medium 2822 (e.g., a non-transitory machine-readable medium, a machine-readable storage medium, a computer-readable storage medium, or any suitable combination thereof) and perform any one or more of the methodologies discussed herein, in whole or in part.

Specifically, FIG. 28 shows the machine 2800 in the example form of a computer system (e.g., a computer) within which the instructions 2824 (e.g., software, a program, an application, an applet, an app, or other executable code) for causing the machine 2800 to perform any one or more of the methodologies discussed herein may be executed, in whole or in part.

In alternative embodiments, the machine 2800 operates as a standalone device or may be connected (e.g., networked) to other machines. In a networked deployment, the machine 2800 may operate in the capacity of a server machine or a client machine in a server-client network environment, or as a peer machine in a distributed (e.g., peer-to-peer) network environment. The machine 2800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2824, sequentially or otherwise, that specify actions to be taken by that machine. Further, while only a single machine is illustrated, the term "machine" shall also be taken to include any collection of machines that individually or jointly execute the instructions 2824 to perform all or part of any one or more of the methodologies discussed herein.

The machine 2800 may include one or more of a processor 2802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2804, and a static memory 2806, which are configured to communicate with each other via a bus 2808. The processor 2802 may contain microcircuits that are configurable, temporarily or permanently, by some or all of the instructions 2824 such that the processor 2802 is configurable to perform any one or more of the methodologies described herein, in whole or in part. For example, a set of one or more microcircuits of the processor 2802 may be configurable to execute one or more modules (e.g., software modules) described herein.

The machine 2800 may further include a graphics display 2810 (e.g., a plasma display panel (PDP), a light emitting diode (LED) display, a liquid crystal display (LCD), a projector, a cathode ray tube (CRT), or any other display capable of displaying graphics or video). The machine 2800 may also include an alphanumeric input device 2812 (e.g., a keyboard or keypad), a cursor control device 2814 (e.g., a mouse, a touchpad, a trackball, a joystick, a motion sensor, an eye tracking device, or other pointing instrument), a storage unit 2816, an audio generation device 2818 (e.g., a sound card, an amplifier, a speaker, a headphone jack, or any suitable combination thereof), and a network interface device 2820.

The storage unit 2816 includes the machine-readable medium 2822 (e.g., a tangible and non-transitory machine-readable storage medium) on which are stored the instructions 2824 embodying any one or more of the methodologies or functions described herein. The instructions 2824 may also reside, completely or at least partially, within the main memory 2804, within the processor 2802 (e.g., within the processor's cache memory), or both, before or during execution thereof by the machine 2800. Accordingly, the main memory 2804 and the processor 2802 may be considered machine-readable media (e.g., tangible and non-transitory machine-readable media). The instructions 2824 may be transmitted or received over the network 190 via the network interface device 2820. For example, the network interface device 2820 may communicate the instructions 2824 using any one or more transfer protocols (e.g., hypertext transfer protocol (HTTP)).

In some example embodiments, the machine 2800 may be a portable computing device, such as a smart phone or tablet computer, and have one or more additional input components 2830 (e.g., sensors or gauges). Examples of such input components 2830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of the input components 2830 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2822 is shown in an example embodiment to be a single medium, the term "machine-readable medium" should be taken to include a single medium or multiple media (e.g., a centralized or distributed database, or associated caches and servers) able to store instructions 2824. The term "machine-readable medium" shall also be taken to include any medium, or combination of multiple media, that is capable of storing the instructions 2824 for execution by the machine 2800, such that the instructions 2824, when executed by one or more processors of the machine 2800 (e.g., processor 2802), cause the machine 2800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the present subject matter is described with reference to specific example embodiments, various modifications and changes may be made to these example embodiments without departing from the broader scope of embodiments of the present disclosure. Such example embodiments of the present subject matter may be referred to herein, individually or collectively, by the term "invention" merely for convenience and without intending to voluntarily limit the scope of this application to any single disclosure or present concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method comprising:
    identifying features associated with buildings within a region, the features comprising, at least, an age of building, a material of building, and number of storeys of the building;
    training, by one or more processors, a machine learning program that learns from the identified features and earthquake damage data to generate a model for predicting damage caused by an earthquake based on an amount of shaking caused by the earthquake, the training including earthquake damage data for a plurality of earthquakes and values for the identified features, the training appraising relationships between the features and the damage caused by the plurality of earthquakes;
    estimating, by the one or more processors using the model, a block damage value, from a plurality of damage values, for blocks in the region caused by the earthquake;
    identifying, by the one or more processors, a critical damage area (CDA) within the region, the CDA comprising a plurality of blocks geographically clustered having the block damage value above a threshold damage value from the plurality of damage values; and
    causing, by the one or more processors, presentation of the CDA within a map of the region.

2. The method as recited in claim 1, further comprising:
    determining parameters for identifying the CDA, the parameters comprising one or more of minimum size of the CDA, maximum size of the CDA, maximum number of CDAs within the region, and maximum distance between blocks in the CDA.

3. The method as recited in claim 2, wherein identifying the CDA further comprises:
   identifying blocks in the region with block damage values above the threshold damage value;
   selecting a plurality of blocks that meet the parameters for identifying the CDA; and
   creating the CDA with the selected plurality of blocks.

4. The method as recited in claim 1, further comprising:
   analyzing values of the features for buildings in the CDA and buildings in an area next to the CDA;
   determining which features show a significant difference between the values of the features for the buildings in the CDA and the buildings in the area next to the CDA; and
   presenting the determined features in a user interface as factors that explain the block damage values for blocks in the CDA.

5. The method as recited in claim 4, wherein determining which features show a significant difference comprises:
   analyzing each of a plurality of features used by the machine learning program, wherein analyzing each feature further comprises:
      calculating one or more statistical values for the values of the feature in the buildings in the CDA;
      calculating one or more of the statistical values for the values of the feature in buildings in the area next to the CDA; and
      identifying the feature as showing the significant difference based on a comparison between the calculated statistical values for the buildings in the CDA and the buildings in the area next to the CDA.

6. The method as recited in claim 5, further comprising:
   sorting the features showing a significant difference based on an estimation of a contribution of each feature for explaining damage differences.

7. The method as recited in claim 1, wherein presentation of the CDA further comprises:
   presenting an area occupied by the CDA in the map of the region with a color different from any color in a rest of the map.

8. The method as recited in claim 1, wherein presentation of the CDA further comprises:
   presenting an area occupied by the CDA in the map of the region surrounded by a line type different from other lines in a rest of the map.

9. The method as recited in claim 1, wherein the features are classified as built environment features, natural environment features, and shaking features.

10. The method as recited in claim 1, wherein the features include one or more of type of structure, amount of shaking, type of soil, structural parameters for a building, population density, damage state, elevation, and spectral displacement.

11. A system comprising:
   a memory comprising instructions; and
   one or more computer processors, wherein the instructions, when executed by the one or more computer processors, cause the one or more computer processors to perform operations comprising:
      identifying features associated with buildings within a region, the features comprising, at least, an age of building, a material of building, and number of storeys of the building;
      training a machine learning program that learns from the identified features and earthquake damage data to generate a model for predicting damage caused by an earthquake based on an amount of shaking caused by the earthquake, the training including earthquake damage data for a plurality of earthquakes and values for the identified features, the training appraising relationships between the features and the damage caused by the plurality of earthquakes;
      estimating, using the model, a block damage value, from a plurality of damage values, for blocks in the region caused by the earthquake;
      identifying a critical damage area (CDA) within the region, the CDA comprising a plurality of blocks geographically clustered having the block damage value above a threshold damage value from the plurality of damage values; and
      causing presentation of the CDA within a map of the region.

12. The system as recited in claim 11, wherein the instructions further cause the one or more computer processors to perform operations comprising:
   determining parameters for identifying the CDA, the parameters comprising one or more of minimum size of the CDA, maximum size of the CDA, maximum number of CDAs within the region, and maximum distance between blocks in the CDA.

13. The system as recited in claim 12, wherein identifying the CDA further comprises:
   identifying blocks in the region with block damage values above the threshold damage value;
   selecting a plurality of blocks that meet the parameters for identifying the CDA; and
   creating the CDA with the selected plurality of blocks.

14. The system as recited in claim 11, wherein the instructions further cause the one or more computer processors to perform operations comprising:
   analyzing values of the features for buildings in the CDA and buildings in an area next to the CDA;
   determining which features show a significant difference between the values of the features for the buildings in the CDA and the buildings in the area next to the CDA; and
   presenting the determined features in a user interface as factors that explain the block damage values for blocks in the CDA.

15. The system as recited in claim 14, wherein determining which features show a significant difference comprises:
   analyzing each of a plurality of features used by the machine learning program, wherein analyzing each feature further comprises:
      calculating one or more statistical values for the values of the feature in the buildings in the CDA;
      calculating one or more of the statistical values for the values of the feature in the buildings in the area next to the CDA; and
      identifying the feature as showing the significant difference based on a comparison between the calculated statistical values for the buildings in the CDA and the buildings in the area next to the CDA.

16. A non-transitory machine-readable storage medium including instructions that, when executed by a machine, cause the machine to perform operations comprising:
   identifying features associated with buildings within a region, the features comprising, at least, an age of building, a material of building, and number of storeys of the building;
   training a machine learning program that learns from the identified features and earthquake damage data to generate a model for predicting damage caused by an earthquake based on an amount of shaking caused by the earthquake, the training including earthquake damage data for a plurality of earthquakes and values for the identified features, the training appraising relationships between the features and the damage caused by the plurality of earthquakes;

estimating, using the model, a block damage value, from a plurality of damage values, for blocks in the region caused by the earthquake;

identifying a critical damage area (CDA) within the region, the CDA comprising a plurality of blocks geographically clustered having the block damage value above a threshold damage value from the plurality of damage values; and causing presentation of the CDA within a map of the region.

17. The machine-readable storage medium as recited in claim 16, wherein the machine further performs operations comprising:

determining parameters for identifying the CDA, the parameters comprising one or more of minimum size of the CDA, maximum size of the CDA, maximum number of CDAs within the region, and maximum distance between blocks in the CDA.

18. The machine-readable storage medium as recited in claim 17, wherein identifying the CDA further comprises:

identifying blocks in the region with block damage values above the threshold damage value;

selecting a plurality of blocks that meet the parameters for identifying the CDA; and creating the CDA with the selected plurality of blocks.

19. The machine-readable storage medium as recited in claim 16, wherein the machine further performs operations comprising:

analyzing values of the features for buildings in the CDA and buildings in an area next to the CDA;

determining which features show a significant difference between the values of the features for the buildings in the CDA and the buildings in the area next to the CDA; and presenting the determined features in a user interface as factors that explain the block damage values for blocks in the CDA.

20. The machine-readable storage medium as recited in claim 19, wherein determining which features show a significant difference comprises:

analyzing each of a plurality of features used by the machine learning program, wherein analyzing each feature further comprises:

calculating one or more statistical values for the values of the feature in the buildings in the CDA;

calculating one or more of the statistical values for the values of the feature in the buildings in the area next to the CDA; and identifying the feature as showing the significant difference based on a comparison between the calculated statistical values for the buildings in the CDA and the buildings in the area next to the CDA.

* * * * *